United States Patent
Shingu

(10) Patent No.: US 11,411,902 B2
(45) Date of Patent: Aug. 9, 2022

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Jun Shingu, Kanagawa (JP)

(73) Assignee: FUJIFILM Buniness Innovation Corp., Tokyo (JP)

(*) Notice: Subject to any disclaimer, the term of this patent is extended or adjusted under 35 U.S.C. 154(b) by 327 days.

(21) Appl. No.: 16/198,895

(22) Filed: Nov. 23, 2018

(65) Prior Publication Data
US 2019/0173815 A1 Jun. 6, 2019

(30) Foreign Application Priority Data
Dec. 4, 2017 (JP) .............. JP2017-232222

(51) Int. Cl.
*H04L 51/066* (2022.01)
*H04L 51/04* (2022.01)
*H04L 51/00* (2022.01)

(52) U.S. Cl.
CPC ............ *H04L 51/066* (2013.01); *H04L 51/04* (2013.01); *H04L 51/16* (2013.01)

(58) Field of Classification Search
CPC ....... H04L 51/16; H04L 51/066; H04L 51/04; H04L 51/26
See application file for complete search history.

(56) References Cited

U.S. PATENT DOCUMENTS

| | | |
|---|---|---|
| 6,496,851 B1 | 12/2002 | Morris et al. |
| 7,216,144 B1 | 5/2007 | Morris et al. |
| 7,415,500 B2 | 8/2008 | Morris et al. |
| 10,397,177 B2 | 8/2019 | Wang et al. |
| 2004/0098462 A1 | 5/2004 | Horvitz et al. |
| 2006/0010208 A1 | 1/2006 | Fujisawa et al. |
| 2007/0226309 A1 | 9/2007 | Bell et al. |
| 2009/0106408 A1 | 4/2009 | Yoshizawa et al. |
| 2009/0131116 A1 | 5/2009 | Tsuchiya |

(Continued)

FOREIGN PATENT DOCUMENTS

| | | |
|---|---|---|
| CN | 1478352 | 2/2004 |
| CN | 1662890 | 8/2005 |

(Continued)

OTHER PUBLICATIONS

"Office Action of Japan Counterpart Application" with English translation thereof, dated Oct. 12, 2021, p. 1-p. 6.

(Continued)

*Primary Examiner* — Matthew Ell
*Assistant Examiner* — David Tan
(74) *Attorney, Agent, or Firm* — JCIPRNET

(57) ABSTRACT

An information processing apparatus includes a conversation presentation unit that present conversation contents in a conversation, which is performed by plural persons, in time series, a reception unit that receives a request, an urging presentation unit that presents urging of a response to the request, and a shifting unit that shifts a screen so as to be capable of presenting a conversation content before or after the request is made, in a case where the response is made.

19 Claims, 19 Drawing Sheets

(56) References Cited

U.S. PATENT DOCUMENTS

| | | | | |
|---|---|---|---|---|
| 2011/0010340 A1* | 1/2011 | Hung | ............ | H04L 51/22 |
| | | | | 707/623 |
| 2017/0048177 A1* | 2/2017 | Offenhartz | ............ | H04L 51/26 |
| 2018/0004762 A1* | 1/2018 | Jazayeri | ............ | H04W 4/12 |
| 2018/0152397 A1* | 5/2018 | Tang | ............ | H04L 12/1813 |
| 2018/0293278 A1* | 10/2018 | Kapoor | ............ | G06Q 50/01 |
| 2018/0337877 A1* | 11/2018 | Lane | ............ | H04L 51/10 |
| 2018/0351899 A1 | 12/2018 | Kano et al. | | |
| 2019/0058680 A1* | 2/2019 | Rosania | ............ | H04L 51/16 |
| 2019/0334854 A1 | 10/2019 | Wang et al. | | |

FOREIGN PATENT DOCUMENTS

| | | |
|---|---|---|
| CN | 101419631 | 4/2009 |
| CN | 105282013 | 1/2016 |
| JP | 2007199768 | 8/2007 |
| JP | 2007293897 | 11/2007 |
| JP | 2008305390 | 12/2008 |
| JP | 2009104288 | 5/2009 |
| JP | 2010231806 | 10/2010 |
| JP | 2014186666 | 10/2014 |
| WO | 2007049405 | 5/2007 |
| WO | 2017018016 | 2/2017 |

OTHER PUBLICATIONS

"Office Action of China Counterpart Application" with English translation thereof, dated Jan. 12, 2022, p. 1-p. 17.

* cited by examiner

FIG. 6

| TOPIC ID (610) | TOPIC NAME (620) | MEMBER ID (630) |
|---|---|---|
|  |  |  |

| CHAT No (710) | MEMBER ID (720) | CONTRIBUTION DATE AND TIME (730) | CHAT CONTENT (740) |
|---|---|---|---|
|  |  |  |  |

| 810 | 820 | 830 | 840 | 850 | 860 |
|---|---|---|---|---|---|
| CONFIRMATION REQUEST ID | MEMBER ID | CONFIRMER ID | OPERATION DATE AND TIME | TOPIC ID | CHAT No |
| | | | | | |

800

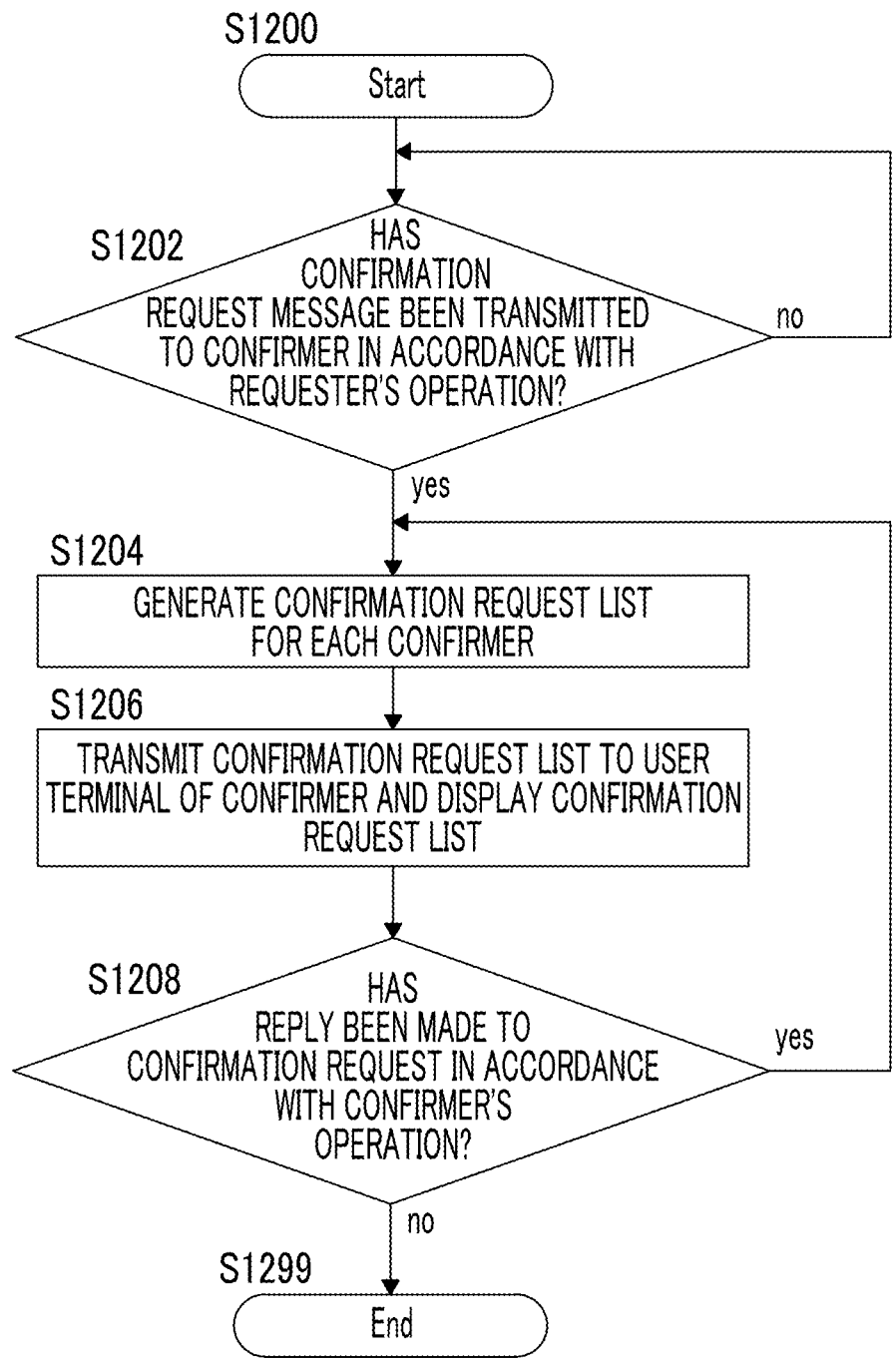

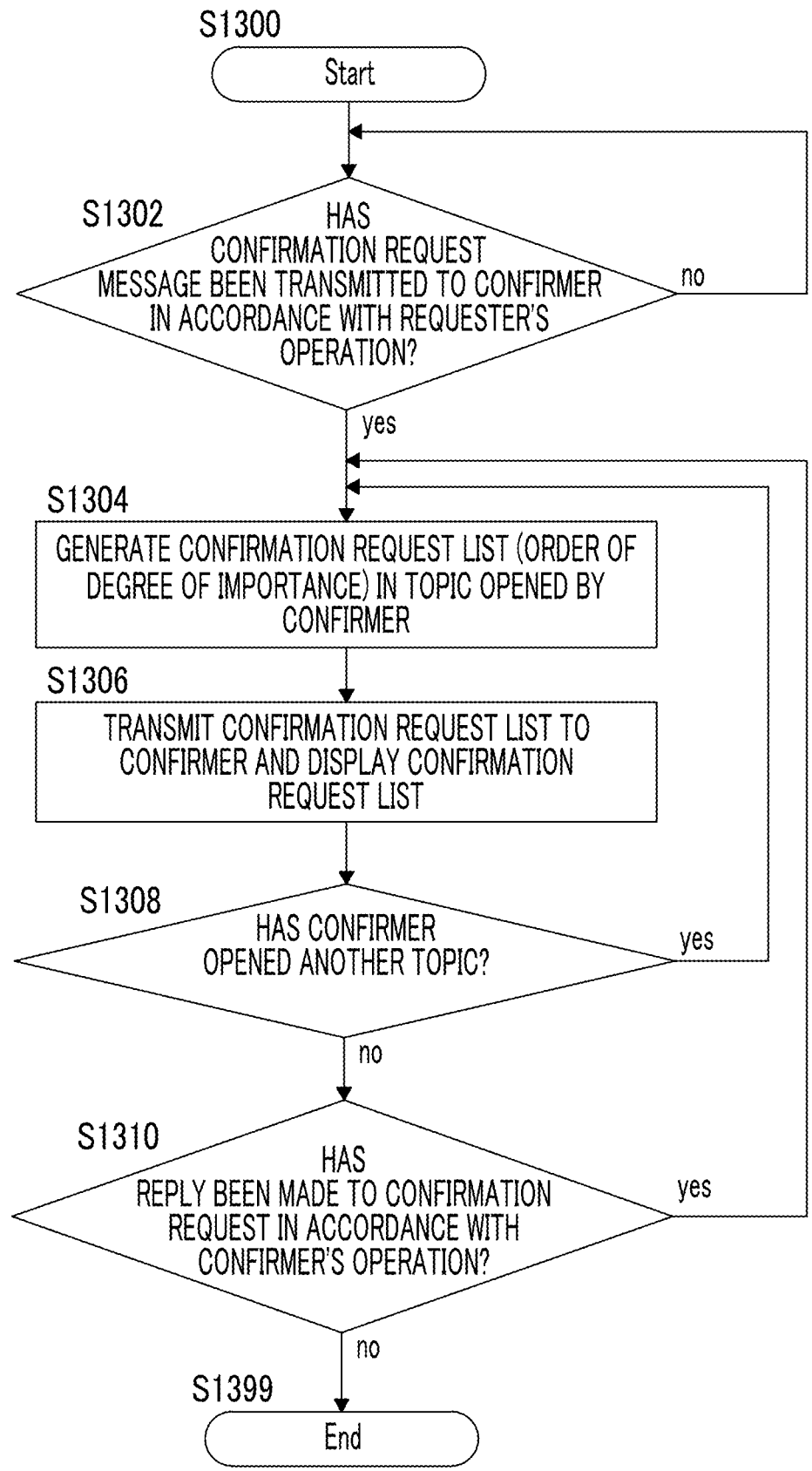

FIG. 14A
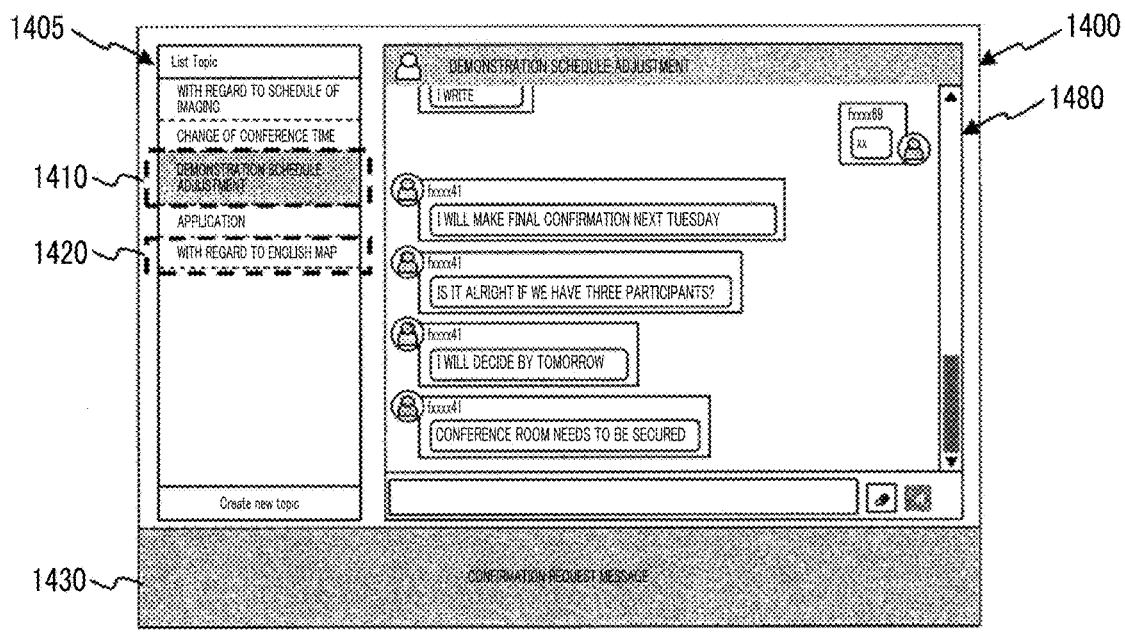
FIG. 14B1
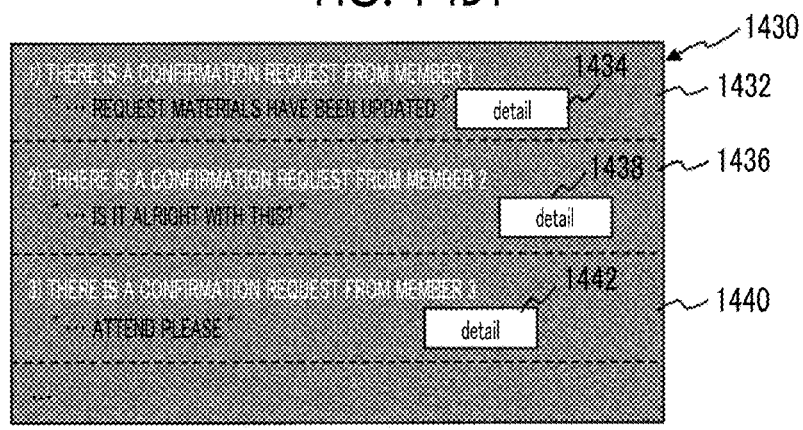
FIG. 14B2
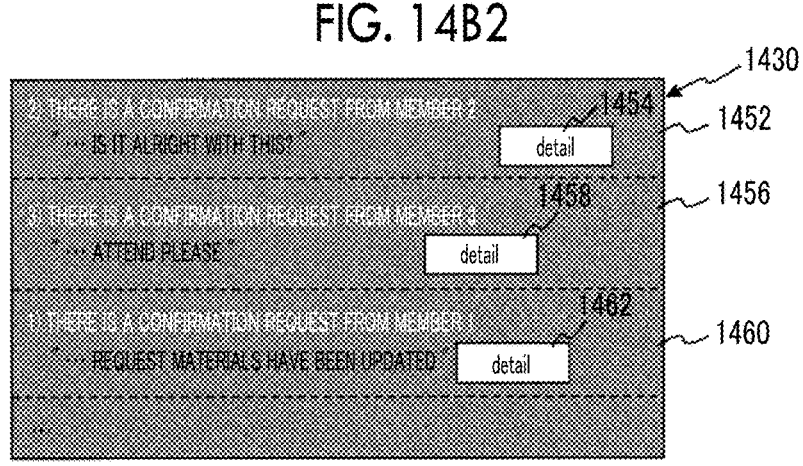

FIG. 17

| Response No | Correspondence Confirmation Request No | Response Date and Time | Response User ID | Response Content | Referrer ID | Reference Date and Time | ... |
|---|---|---|---|---|---|---|---|
| 1710 | 1720 | 1730 | 1740 | 1750 | 1760 | 1770 | 1700 |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-232222 filed Dec. 4, 2017.

BACKGROUND

Technical Field

The present invention relates to an information processing apparatus and a non-transitory computer readable medium storing an information processing program.

SUMMARY

According to an aspect of the invention, there is provided an information processing apparatus including a conversation presentation unit that presents conversation contents in a conversation, which is performed by plural persons, in time series, a reception unit that receives a request, an urging presentation unit that presents urging of a response to the request, and a shifting unit that shifts a screen so as to be capable of presenting a conversation content before or after the request is made, in a case where the response is made.

BRIEF DESCRIPTION OF THE DRAWINGS

Exemplary embodiment(s) of the present invention will be described in detail based on the following figures, wherein:

FIG. 6 is a diagram illustrating an example of a data structure of a topic management table;

FIG. 7 is a diagram illustrating an example of a data structure of a chat management table;

FIG. 8 is a diagram illustrating an example of a data structure of a confirmation request management table;

FIG. 12 is a flowchart illustrating a processing example according to this exemplary embodiment;

FIG. 13 is a flowchart illustrating a processing example according to this exemplary embodiment;

FIGS. 14A to 14B2 are diagrams illustrating a processing example according to this exemplary embodiment;

FIG. 17 is a diagram illustrating an example of a data structure of a response management table;

DETAILED DESCRIPTION

Hereinafter, an example of an exemplary embodiment in realizing the invention will be described with reference to the accompanying drawings.

Figure 1:
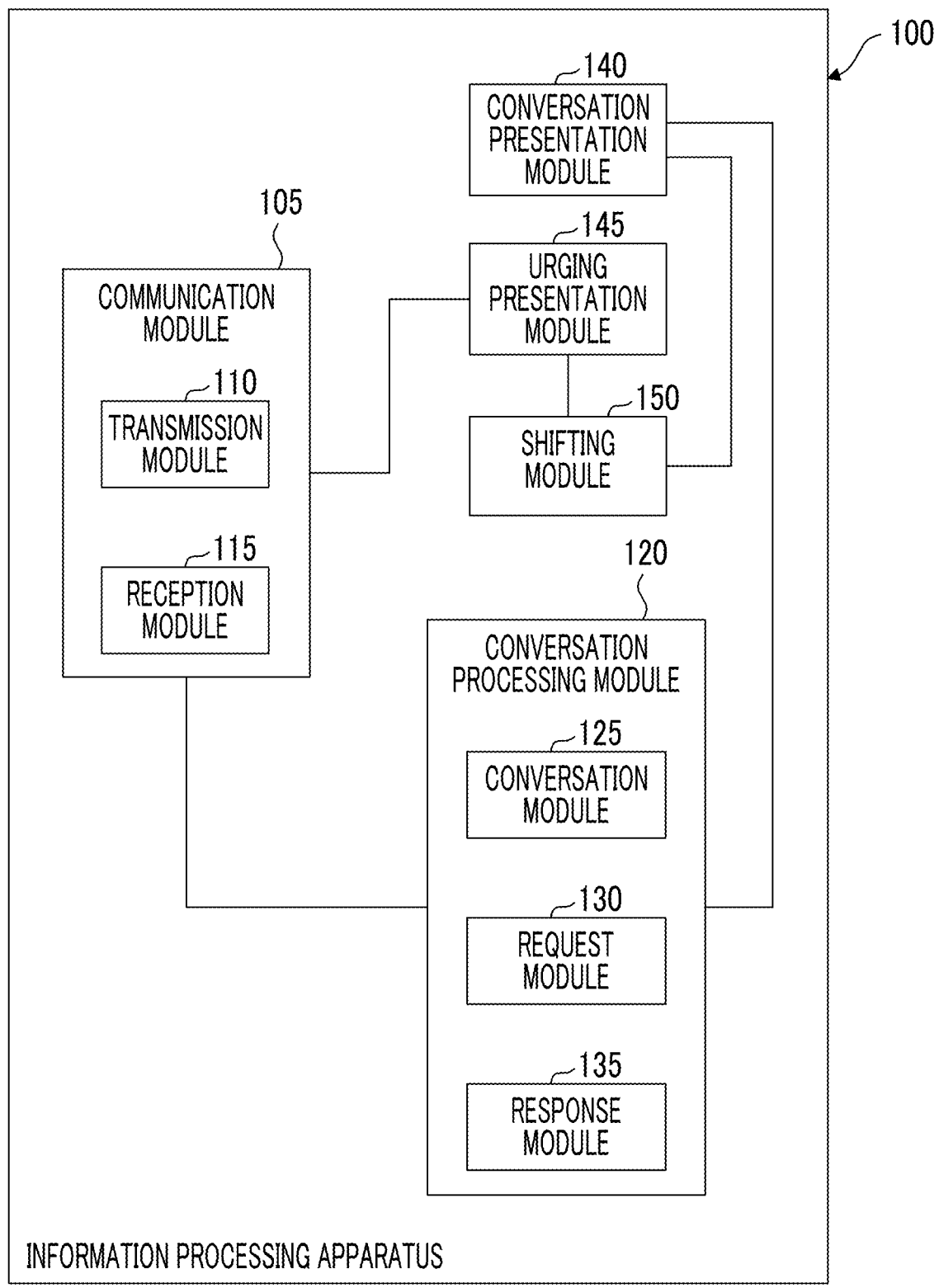
FIG. 1 is a conceptual module configuration diagram illustrating a configuration example of this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication line, and registers, and the like inside a central processing unit (CPU).

An information processing apparatus 100 which is this exemplary embodiment makes a request for confirmation, or the like from a party as a conversation content, in performing a conversation service, and includes a communication module 105, a conversation processing module 120, a conversation presentation module 140, an urging presentation module 145, and a shifting module 150 as illustrated in the example of FIG. 1.

Meanwhile, the conversation service is a service for enabling a conversation mainly based on a character string (may include, for example, a mark, a pictograph, an image, and the like) in real time, and can present a conversation content in a conversation, which is performed by plural persons, in time series. A process of making the previous and subsequent conversations confirmable by scrolling may be performed. Examples of the conversation service include a chat in which user terminals 200 perform real-time communication with each other through a communication line, a message transmission and reception function on a Social Networking Service (SNS), and the like.

The communication module 105 includes a transmission module 110 and a reception module 115, and is connected to the conversation processing module 120 and the urging presentation module 145. The communication module 105 performs communication with the user terminal 200 which is used by a participant (also referred to as a user) of a conversation. For example, the communication module receives a conversation and transmits the conversation to a participant who is a conversation party.

The transmission module 110 transmits a conversation and the like to the user terminal 200.

The reception module 115 receives a conversation and the like from the user terminal 200.

The conversation processing module 120 includes a conversation module 125, a request module 130, and a response module 135, and is connected to the communication module 105 and the conversation presentation module 140. The conversation processing module 120 performs processing of a conversation service.

The conversation module 125 performs a conversation service. That is, the conversation module receives conversation data from the user terminal 200 causing a conversation, transmits the conversation data to the user terminal 200 which is a conversation party, and presents the conversation content thereof. The conversation is performed by plural persons, and the number of persons may be two or more.

In a case where there are plural conversation groups, the conversation module 125 performs a conversation service for each conversation group. That is, a conversation is transmitted to user terminals 200 of users belonging to the group.

Here, the "conversation group" refers to a group constituted by plural users who participate in a conversation, and is also referred to as, for example, a cell, a room, a conference room, or the like.

For example, in a case where a conversation group is formed for each topic as the "conversation group", the same is true of each topic.

The request module 130 receives "request" from a user terminal 200A through the communication module 105. The user terminal 200A as mentioned herein is a user terminal 200 which is used by a user who has made a request. In this case, a user who is a request destination is designated. Meanwhile, the request may be clearly designated by the user. For example, as described later using examples of FIGS. 9A and 9B, a "request" may be an operation in which a user selects a confirmation request button 910, writes a request in a confirmation request reception region 930, and selects a transmission button 950. In addition, it may be determined that a "request" has been made by determining a conversation content. For example, natural language processing may be performed in a case where "?" is added at the end of a conversation, machine learning may be performed by a set of a message and the above-described clear request in a case where a request text is determined, and a "request" may be determined in a case where a request text is determined by artificial intelligence. Regarding a request destination in a case where determination is performed on the basis of a conversation content, a predetermined user may be set to be a request destination. For example, a combination of a user making a request and a user who is a request destination may be generated in advance, all users other than a user making a request in a corresponding conversation group may be set to be request destinations, or a superior officer of a user making a request may be set to be a request destination.

The response module 135 receives a "response" (hereinafter, also referred to as confirmation) which corresponds to a request from the user terminal 200B through the communication module 105. The user terminal 200B as mentioned herein is a user terminal 200 which is used by a user (hereinafter, also referred to as a respondent or a confirmer) who is a request destination.

The conversation presentation module 140 is connected to the conversation processing module 120 and the shifting module 150. The conversation presentation module 140 presents a conversation content in a conversation, which is performed by plural persons, in time series. Meanwhile, the "presentation" as mentioned herein includes controlling the user terminal 200 connected through a communication line to present a conversation content. For example, a presentation command for instructing a conversation content, a display position, a display mode, or the like is transmitted to the user terminal 200 through the communication module 105. Specifically, data to be transmitted may be written in HyperText Markup Language (HTML) or the like. The "presentation" may include the display of an image, a movie, and the like, the output of a sound, vibration, and the like, in addition to the display of a character as a conversation content.

The urging presentation module 145 is connected to the communication module 105 and the shifting module 150. The urging presentation module 145 presents the urging of a response to a request.

In a case where there are plural requests, the urging presentation module 145 may present the requests in accordance with the degrees of importance of the requests. Meanwhile, in a case where the degree of importance is not used, the requests are displayed in order of dates and times of the requests, in order of names (for example, in alphabetical order, or the like) of users having made the requests, or the like.

Further, in a case where a response to a request is referred to by a person other than a person having made the request, the urging presentation module 145 may increase the degree of importance of the request. Meanwhile, the "reference of response" includes an operation for confirming that the response has been made. For example, the "reference of response" may include the reference of a conversation content group (topic) in which a request has been made with respect to a response. That is, the operation may be an operation indicating that the response is waited for.

In a case where the number of persons having performed reference is large, the urging presentation module 145 may increase the degree of importance of a request. The "large number of persons" as mentioned herein means that the number of persons having performed reference is equal to or greater than a predetermined threshold value.

In a case where the number of times of reference of a response to a request is large, the urging presentation module 145 may increase the degree of importance of the request. The "large number of times of reference of a response" as mentioned herein means that the number of times of the reference of the response is equal to or greater than a predetermined threshold value.

In a case where a response is made, the urging presentation module 145 may increase the degree of importance of a request in a case where a user having made the request is in the vicinity of a user having made the response. The "case of being in the vicinity" as mentioned herein means being physically close (being close in the real world), and means that a distance between users is equal to or less than a predetermined threshold value. In this case, the degree of importance is increased because a person making a response can directly (face) confirm a request content without using a conversation service in a case where a user having made a request is in the vicinity of the person making the response.

Further, the urging presentation module 145 may detect the position of a user having made a request and the position of a user having made a response, and may determine the degree of importance in accordance with a distance between the users. For example, the position may be detected using a Global Positioning System (GPS) embedded into the portable terminal or an indoor sensing technique (a technique for measuring where the user is) in a case where a user terminal 200 used by the user is a portable terminal, or the position may be detected by creating a table storing correspondence between a Personal Computer (PC) and the installation position of the PC and by using the table in a case where the user terminal 200 used by the user is the PC.

In a case where the distance is equal to or less than a predetermined value, the urging presentation module 145 may determine the degree of importance based on the distance. The users may not directly meet each other in a case where the distance is equal to or greater than the predetermined value.

When there are plural users to make a response to a request and a response has been made from the user, the urging presentation module 145 may present the degree of importance of the request for the users not having made a response by reducing the degree of importance. Here, the wording "when there are plural users to make a response to a request and a response has been made from the user" corresponds to a case where there are plural respondents having received a request and one or more respondents among the respondents have already made a response. Since other respondents have already made a response, the degree of importance of a response of the respondents not having made a response yet is reduced. Since the degree of importance is reduced, the request may be presented at a lower rank.

Further, the urging presentation module 145 performs presentation to the effect that another user has made a response, with respect to the user who has not made a response. Therefore, the respondent not having made a response can know that the other respondents have already made a response to the request.

The shifting module 150 is connected to the conversation presentation module 140 and the urging presentation module 145. The shifting module 150 shifts a screen of the user terminal 200 so that a conversation content before or after a request is made may be presented in a case where a response is made.

Here, "the conversation content before or after a request is made" is used. Therefore, the presentation may be used for any one of three types of "a conversation content before a request is made", "a conversation content after a request is made", and "conversation contents before and after a request is made". In addition, an object to be presented may include or may not include a conversation content which is a request. Since conversation contents are presented in time series, "presentation of a conversation content before a request is made" means that presentation is performed by setting a conversation content which is a request (or a conversation content immediately before a conversation which is a request) to be located at the tail, "presentation a conversation content after a request is made" means that presentation is performed by setting a conversation content which is a request (or a conversation content immediately after a conversation which is a request) to be located at the head, and "presentation of conversation contents before and after a request is made" means that presentation including a conversation content which is a request is performed. Further, the "presentation including a conversation content which is a request" refers to display including at least one or more conversation contents of conversations before and after "a conversation which is a request", and include, for example, setting "request" to be located at the center of the screen.

Regarding which one among them is to be presented, an interval A between "a conversation which is a request" and "a conversation immediately before the conversation which is a request" and an interval B between "the conversation which is a request" and "a conversation immediately after the conversation which is a request" may be compared with each other to present a conversation group having a shorter interval. This is because there is a strong possibility that the conversation having a shorter interval is continuous. Meanwhile, in a case where a difference between the interval A and the interval B is equal to or less than or less than a predetermined value, "presentation of conversation contents before and after a request is made" may be performed. This is because there is a strong possibility that conversations before and after "a conversation which is a request" are continuous with each other.

In addition, the shifting module 150 may perform shifting in a case where the number of persons for a conversation is equal to or greater than a predetermined number of persons. Meanwhile, the "predetermined number of persons" as mentioned herein is generally two or more, but may include one.

This is because a conversation content before or after a request is made is not required to be presented (for example, a case of the latest conversation, or the like) in a case of a conversation performed by a small number of persons, and it becomes complicated in a case where the screen is shifted.

Further, in a case where a conversation is performed by three or more persons, the shifting module 150 may perform a shift. Particularly, in a case where a conversation is performed by two or more persons, the conversation is necessarily performed between the two persons, and a response is generally made immediately after a request is made. Accordingly, this is because there is a strong possibility that a response may be made without shifting and presenting a conversation content before and after a request is made.

In addition, the shifting module 150 may not shift the screen until a response is made.

By this process, a respondent may not perform the next operation in a case where the respondent does not make a response.

A process for "preventing the screen from being shifted" specifically includes presenting a pop-up screen for receiving only a response, not performing scrolling, not performing a shift to a screen of a conversation of another group, and the like.

In a case there are plural conversation groups, the urging presentation module 145 may present a request in a conversation in a second group different from a first group performing the current conversation.

In a case where a response to the request in the conversation in the second group is made, the shifting module 150 may perform a shift to a screen presenting the conversation in the second group. In a case where a screen of the conversation in the first group is presented, a shift to the screen of the conversation in the second group is performed. Naturally, in the second screen, a shift to a screen presenting a conversation content before and after a request is made is performed.

In addition, the shifting module 150 may not perform a shift to a screen presenting a conversation in another group until a response to a request is made. By this process, a respondent may not perform a conversation in another group in a case where the respondent does not make a response.

The shifting module 150 may not perform return to the screen presenting the conversation in the first group until a response to a request is made.

Figure 2:
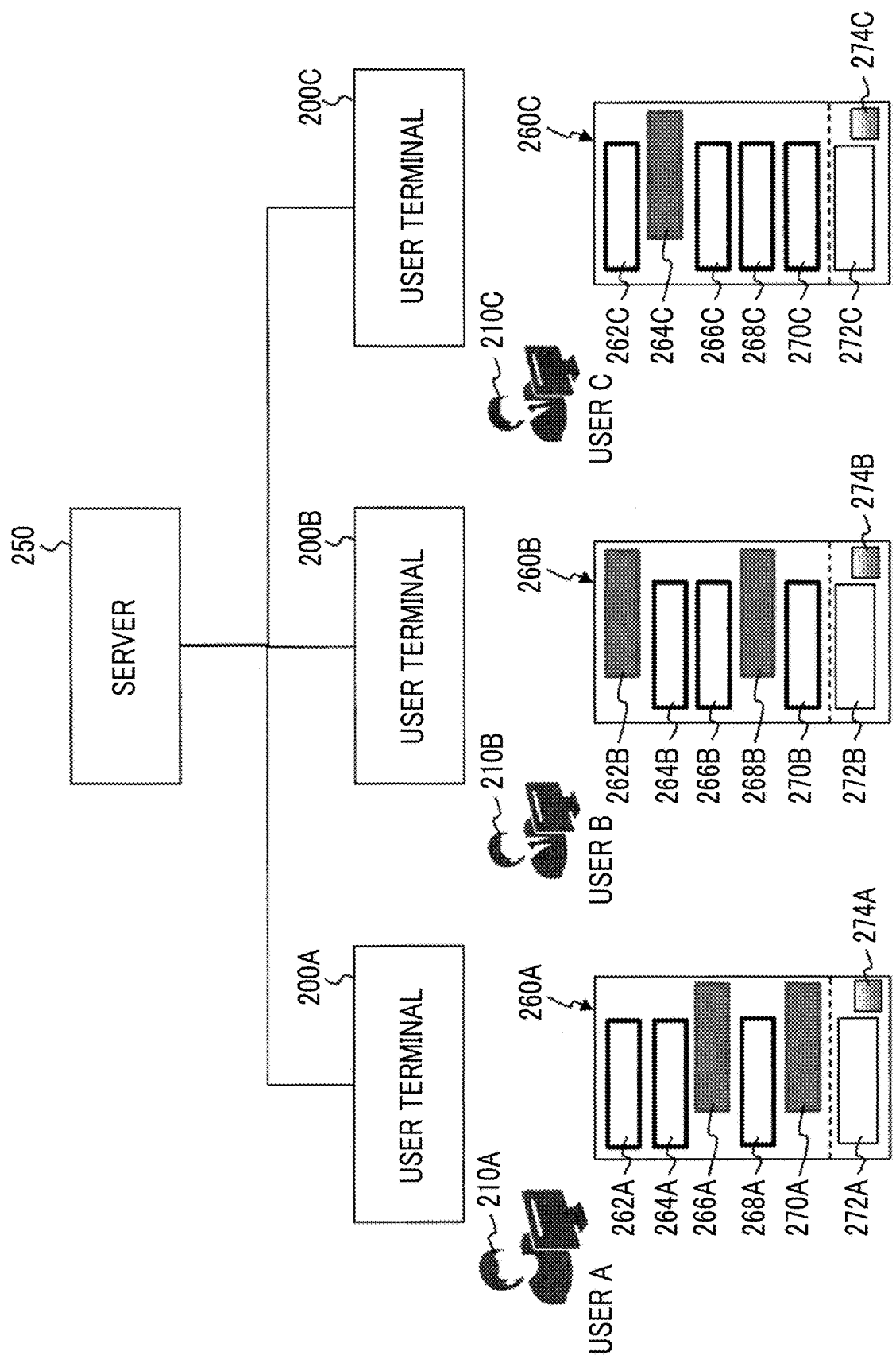
FIG. 2 is a diagram illustrating a system configuration example using this exemplary embodiment.

FIG. 2 is a diagram illustrating a system configuration example using this exemplary embodiment.

The user terminal 200A, the user terminal 200B, and a user terminal 200C are connected to a server 250 through a communication line. The user terminal 200 is used by a user 210, and has a function as a client for the server 250. The server 250 includes the information processing apparatus 100. The server 250 provides a conversation service (chat system).

In a case where each user 210 uses the user terminal 200 to contribute a message, the message is stored in the server 250 and is distributed to each user terminal 200.

Specifically, a conversation content (message) is written in a message reception region 272A of a conversation screen 260A of the user terminal 200A by an operation of a user A 210A. In a case where a transmission button 274A is selected (contribution), the conversation content is transmitted to the server 250. Meanwhile, the user A 210A, a user B 210B, and a user C 210C form one group of a conversation.

The server 250 transmits the conversation content to the user A 210A, the user B 210B, and the user C 210C who belong to the same group. Each conversation screen 260 receives the conversation content, and displays a message 270 as the latest conversation content within the conversation screen 260. Meanwhile, a conversation content contributed by the user 210 and a conversation content contributed by another user 210 are respectively displayed in time series on the right side and the left side within the conversation screen 260.

In the conversation screen 260, a message 262, a message 264, a message 266, and a message 268 are displayed as the past conversation contents in time series (in order from the older contribution date and time downward).

Figure 3:
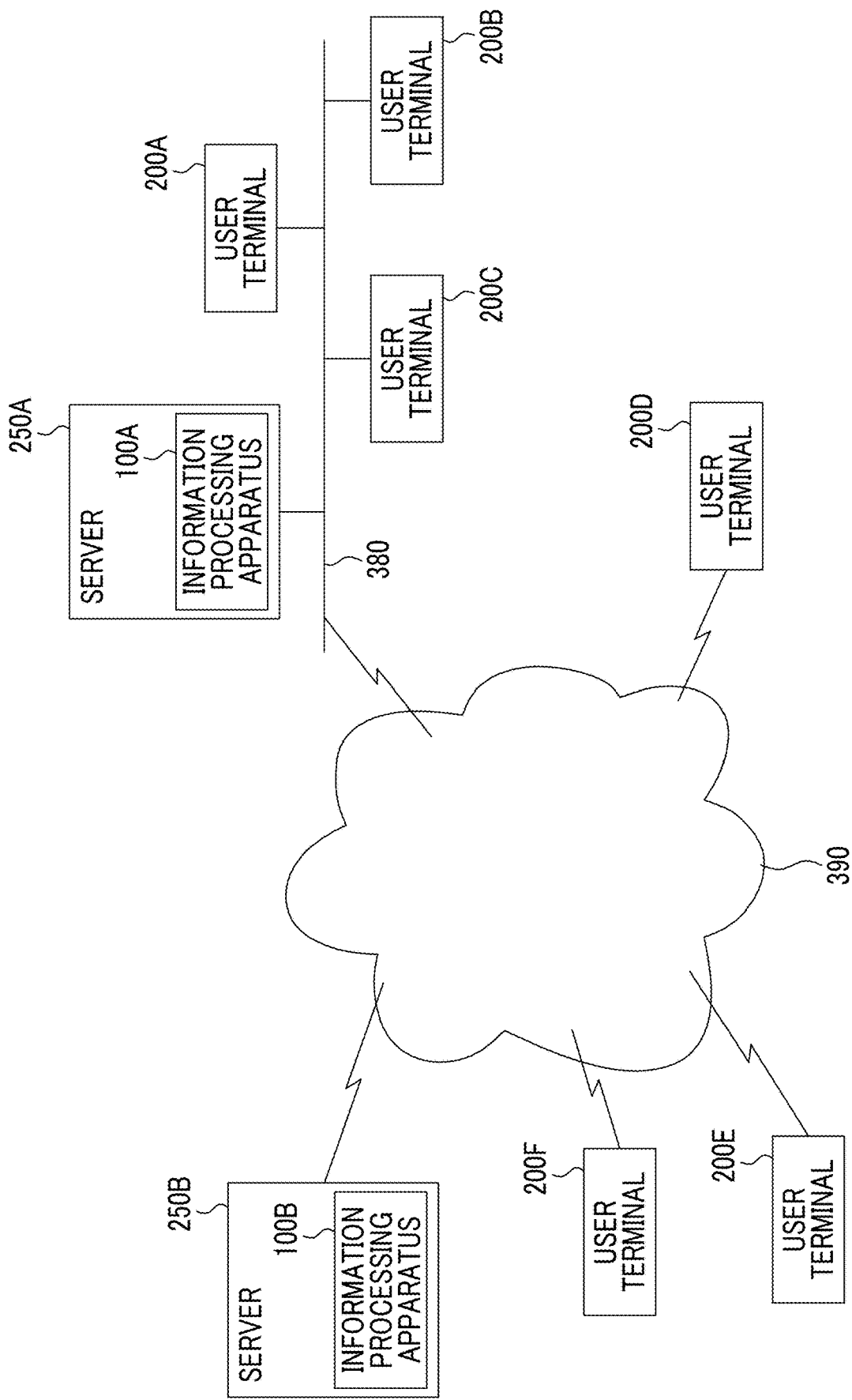
FIG. 3 is a diagram illustrating a system configuration example using this exemplary embodiment.

FIG. 3 is a diagram illustrating a system configuration example using this exemplary embodiment.

A server 250A includes an information processing apparatus 100A. The user terminal 200A, the user terminal 200B, the user terminal 200C, and the server 250A are connected to each other through a communication line 380. The communication line 380 may be a wireless line, a wired line, or a combination thereof, and may be, for example, an intranet, or the like as communication infrastructure. For example, in a case where a conversation service of the server 250A is used in executing work in a company, a superior officer or the like who is a respondent may be requested to perform confirmation, as an example of a request. However, the respondent does not always necessarily use the conversation service, and may participate in another conversation group. In this case, the server 250A urges the user terminal 200 of the respondent to make a response. However, the respondent may not ascertain what confirmation it is. Consequently, the server 250A presents a conversation content before or after a request is made, to the user terminal 200 of the respondent. The respondent may make a response by viewing the conversation content.

The server 250B includes an information processing apparatus 100B. A user terminal 200D, a user terminal 200E, a user terminal 200F, and a server 250B are connected to each other through a communication line 390, and the user terminal 200A, the user terminal 200B, the user terminal 200C, and the server 250A are connected to each other through the communication line 390 and the communication line 380. The communication line 390 may be a wireless line, a wired line, or a combination thereof, and may be, for example, the Internet, an intranet, or the like as communication infrastructure. The invention is not limited to work in a company, and confirmation (for example, confirmation of a meeting place) in a meeting between friends, and the like may occur. Also in this case, the server 250B urges the user terminal 200 of the respondent to make a response, and presents a conversation content before or after a request is made, to the user terminal 200 of the respondent. The respondent may make a response by viewing the conversation content.

Meanwhile, the function of the server 250 may be realized as a cloud service.

Figure 4:
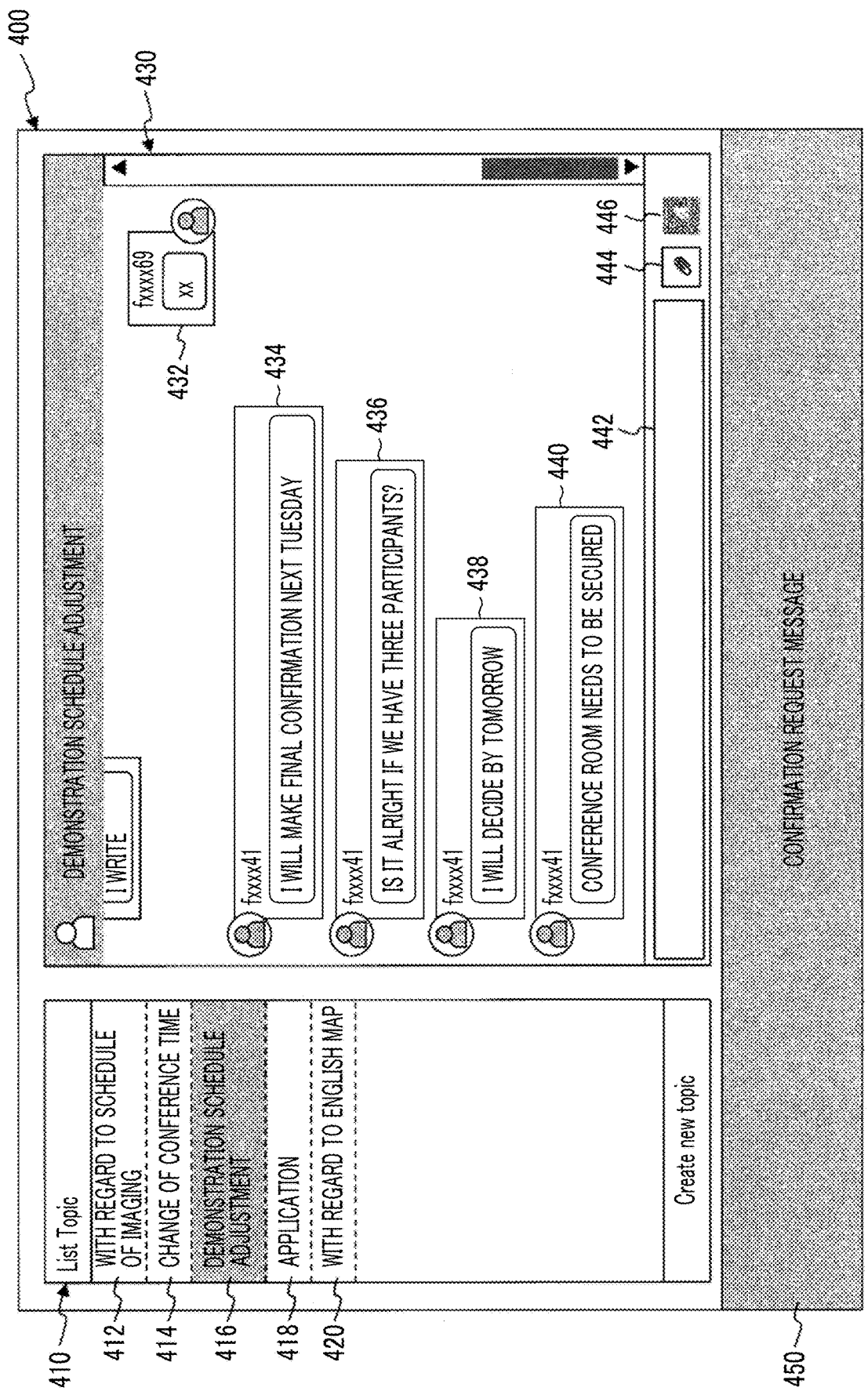
FIG. 4 is a diagram illustrating a processing example according to this exemplary embodiment.

FIG. 4 is a diagram illustrating a processing example according to this exemplary embodiment. The drawing illustrates a screen 400 of the user terminal 200.

A list topic region 410, a message region 430, and a confirmation request display region 450 are displayed on the screen 400.

In the list topic region 410, a topic in which a user participates or may participate is displayed. The topic as mentioned herein is an example of a conversation group. For example, a topic 412 (with regard to schedule of imaging), a topic 414 (change of conference time), a topic 416 (demonstration schedule adjustment), a topic 418 (application), and a topic 420 (with regard to English map) are displayed. In a case where any one topic is selected by a user, a conversation content in the topic is displayed within the message region 430. The example of FIG. 4 shows a state where the topic 416 is selected. That is, "demonstration schedule adjustment" is set as a topic, and a user "Fxxxx69" and a user "Fxxxx41" have a conversation with each other. The conversation may be performed by three or more persons.

In the message region 430, a message 432, a message 434, a message 436, a message 438, a message 440, and the like which are conversation contents of each participant are displayed so as to be scrollable. In a case where a scroll operation is performed, the earlier conversation content is displayed. A message reception region 442 in which a user writes a conversation content, an attachment button 444 for designating a document to be attached to the conversation content, and a transmission button 446 for contributing the conversation content are displayed.

In the confirmation request display region 450, the presence of a request from another user and the necessity to make a response are displayed to a user that uses a conversation service. In addition, the request may be displayed in order of the degree of importance.

Figure 5:
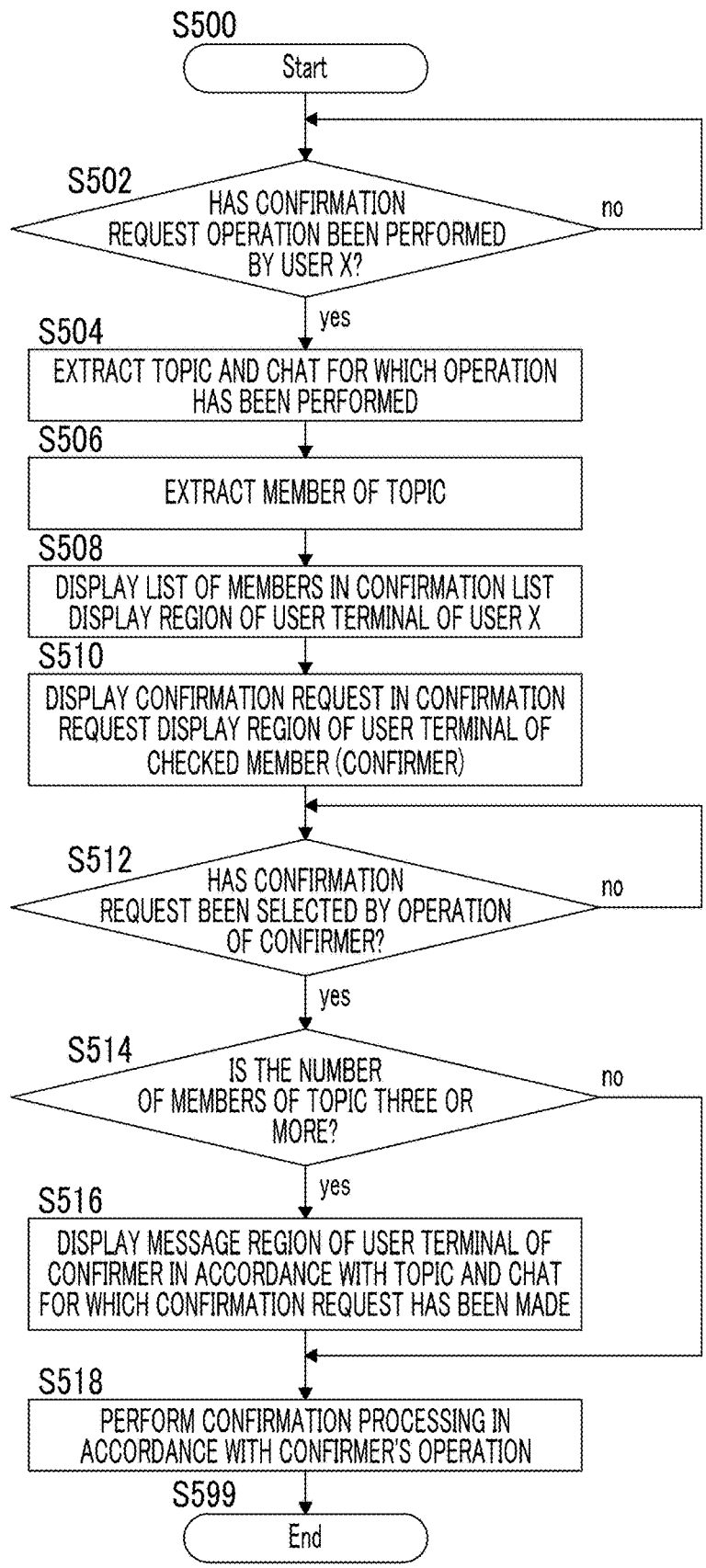
FIG. 5 is a flowchart illustrating a processing example according to this exemplary embodiment.

FIG. 5 is a flowchart illustrating a processing example according to this exemplary embodiment.

In step S502, it is determined whether or not a user X has performed a confirmation request operation (an example of a request). In a case where the confirmation request operation has been performed, the processing proceeds to step S504. Otherwise, the processing stands by until a confirmation request operation is performed.

Figure 9A:
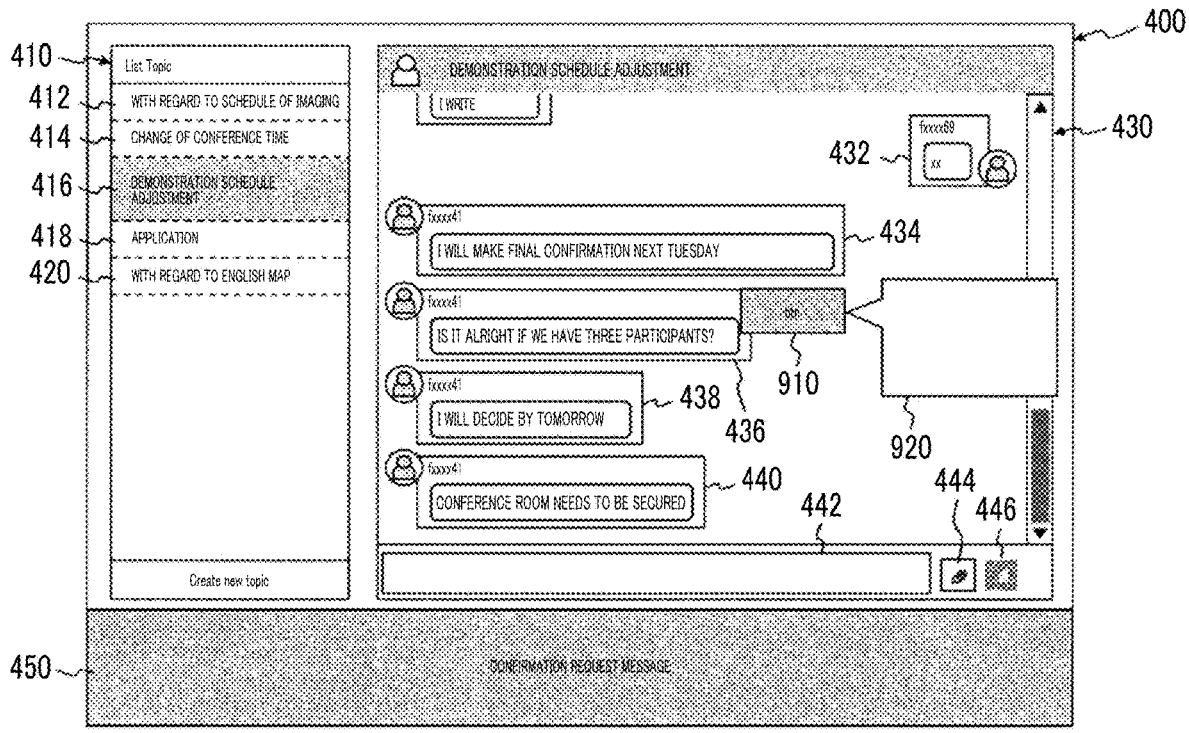
FIGS. 9A and 9B are diagrams illustrating a processing example according to this exemplary embodiment.
Figure 9B:
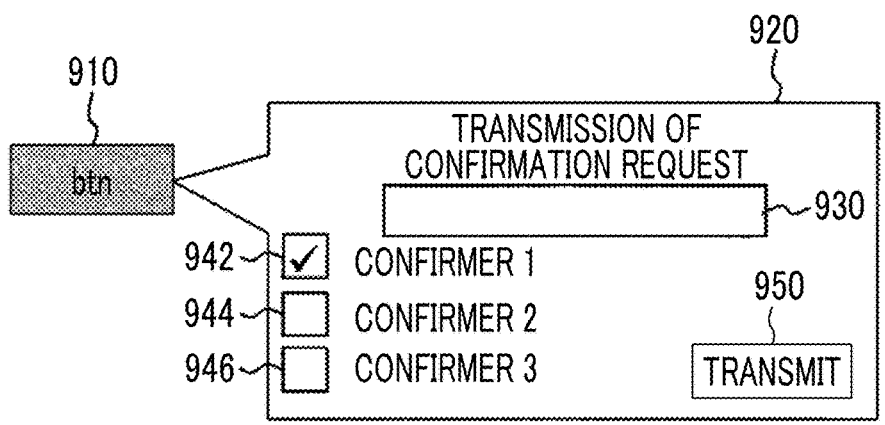

FIGS. 9A and 9B are diagrams illustrating a display processing example of a confirmation request according to this exemplary embodiment.

FIG. 9A illustrates an example in which a confirmation request button 910 is displayed on the screen 400 illustrated in the example of FIG. 4. For example, in a case where it is detected that a mouse pointer overlaps (mouse over) the message 436, the confirmation request button 910 is displayed. Additionally, the confirmation request button 910 may be displayed in a case where it is detected that the message 436 is double-clicked, and the confirmation request button 910 may be displayed in a case where it is detected that the message 436 is clicked while pressing a predetermined key (for example, a control key).

Meanwhile, a message desired to be confirmed (specifically, a message that a mouse overlaps) is generally one's own (here, a member X) message, but may be another member's message.

In addition, a display content within the confirmation request button 910 is determined by steps S504 and S506.

Meanwhile, the management of a user who participates in a topic is performed using, for example, a topic management table 600. FIG. 6 is a diagram illustrating an example of a data structure of the topic management table 600. The topic management table 600 includes a topic ID column 610, a topic name column 620, and a member ID column 630. The topic ID column 610 stores information (topic Identification (ID)) for uniquely identifying a topic in this exemplary embodiment. The topic name column 620 stores the name of the topic. The member ID column 630 stores information (member ID) for uniquely identifying a member who participates in the topic in this exemplary embodiment.

In addition, the management of a conversation content is performed using, for example, a chat management table 700. FIG. 7 is a diagram illustrating an example of a data structure of the chat management table 700. The chat management table 700 includes a chat No column 710, a member ID column 720, a contribution date and time column 730, and a chat content column 740. The chat No column 710 stores a chat No. Here, the chat No refers to information for identifying individual messages. For example, the chat No corresponds to an identification number of the message 434 illustrated in FIG. 4. The member ID column 720 stores a member ID of a member who contributing a message indicated by the chat No. The contribution date and time column 730 stores a date and time (may be year, month, day, hour, minute, second, a time unit smaller than second, or a combination thereof) when the message is contributed. The chat content column 740 stores a chat content (a message content, a conversation content).

Meanwhile, the chat management table 700 is generated for each topic.

In addition, the management of a confirmation request is performed using, for example, a confirmation request management table 800. FIG. 8 is a diagram illustrating an example of a data structure of the confirmation request management table 800. The confirmation request management table 800 includes a confirmation request ID column 810, a member ID column 820, a confirmer ID column 830, an operation date and time column 840, a topic ID column 850, and a chat No column 860. The confirmation request ID column 810 stores information (confirmation request ID) for uniquely identifying a confirmation request in this exemplary embodiment. The member ID column 820 stores a member ID of a member who has made the confirmation request. The confirmer ID column 830 stores a member ID of a confirmer who is a transmission destination of the confirmation request. Meanwhile, the confirmer ID column may store member IDs of plural persons. The operation date and time column 840 stores a date and time when the confirmation request operation is performed. The topic ID column 850 stores a topic ID of a topic for which the confirmation request operation is performed. The chat No column 860 stores a chat No of a message for which the confirmation request operation is performed.

In step S504, a topic and a chat for which the operation has been performed are extracted. Specifically, the topic and the chat for which the operation detected in step S502 may be extracted.

In step S506, a member of the topic is extracted. Specifically, the member may be extracted using the topic management table 600 from the topic extracted in step S504.

In step S508, a list of members is displayed in the confirmation list display region 920 of the user terminal 200 of the user X.

Specifically, as illustrated in the example of FIG. 9B, in a case where the confirmation request button 910 is selected, pop-up display of the confirmation list display region 920 is performed. In the confirmation list display region 920, a confirmation request reception region 930, a confirmation destination user display region 942, a confirmation destination user display region 944, a confirmation destination user display region 946, and a transmission button 950 are displayed. In the confirmation request reception region 930, request matters with respect to a user who is a request destination are written by a user. As the request destination, for example, the confirmation destination user display region 942, the confirmation destination user display region 944, and the confirmation destination user display region 946 are displayed. Meanwhile, the "confirmer" as used herein is a respondent who is a request destination. For example, a list of members (except for the user himself or herself) of the topic extracted in step S506 is displayed. The user X selects a member who the user desires to confirm (check in a check box). In a case where the transmission button 950 is selected by the user X, the user terminal 200 transmits information on the confirmation request to the server 250 and the server 250 generates the confirmation request management table 800, and the processing proceeds to step S510.

In step S510, the confirmation request is displayed in the confirmation request display region 450 of the user terminal 200 of the checked member (confirmer).

Figure 10:
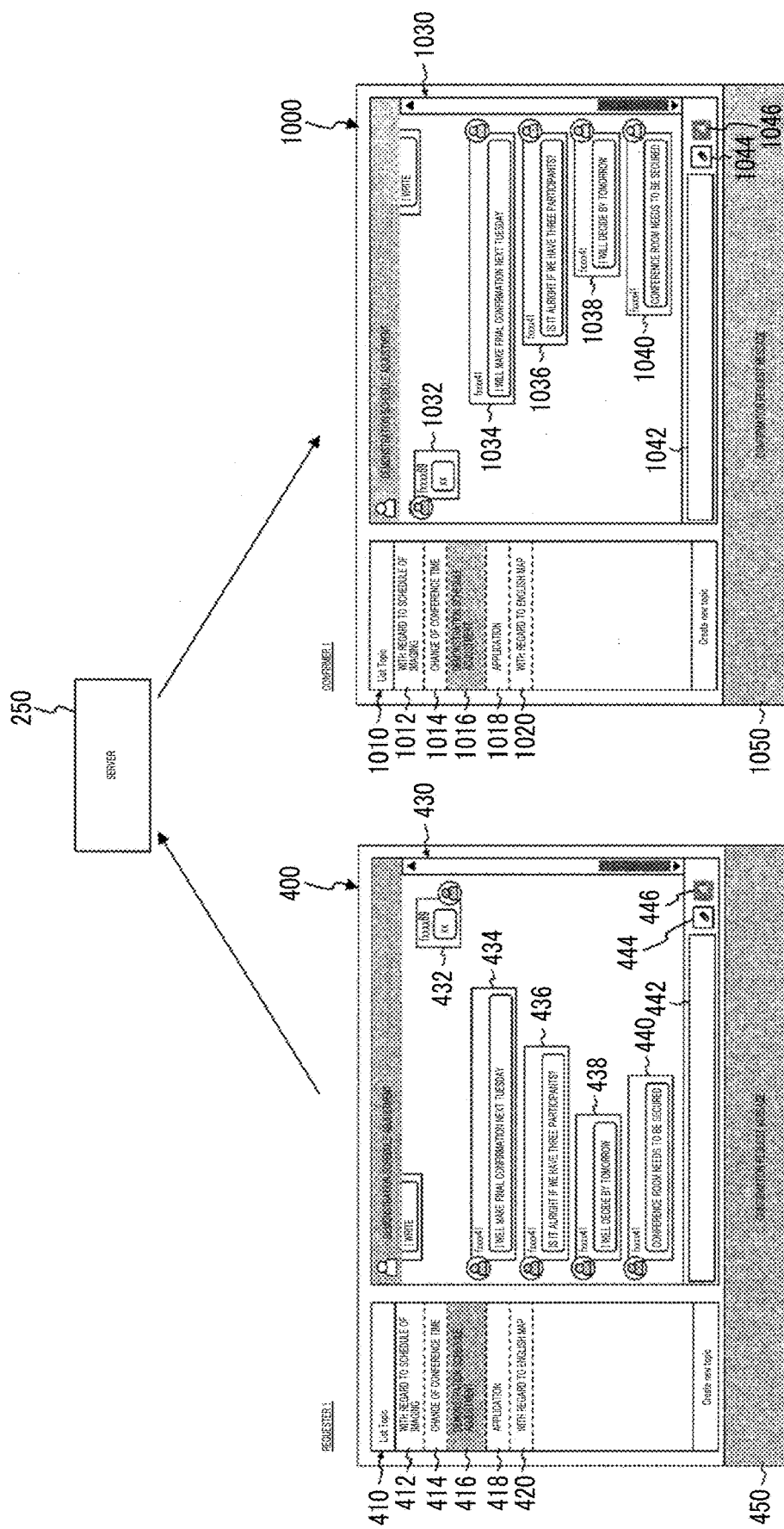
FIG. 10 is a diagram illustrating a processing example according to this exemplary embodiment.

FIGS. 10 and 11 are diagrams illustrating a processing example (step S510) according to this exemplary embodiment.

In a case where the transmission button 950 illustrated in the example of FIGS. 9A and 9B is selected, information on a confirmation request is transmitted to the server 250 from the screen 400 on the left side illustrated in the example of FIG. 10. The server 250 performs presentation for urging a response, on a screen 1000 (specifically, a confirmation request display region 1050) of a user terminal 200 of a confirmer on the right side illustrated in the example of FIG. 10.

Figure 11A:
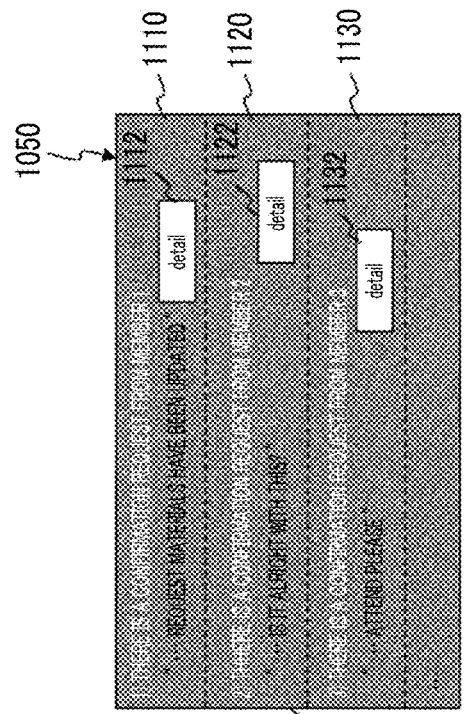
FIGS. 11A to 11D are diagrams illustrating a processing example according to this exemplary embodiment.
Figure 11B:
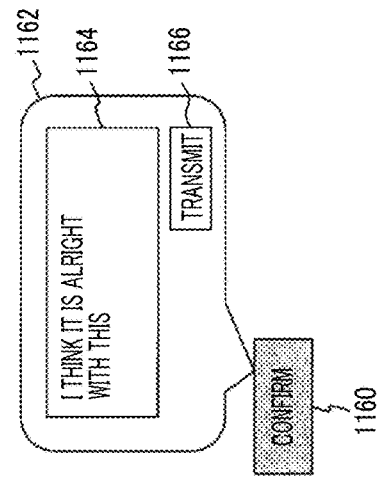

Specifically, the confirmation request display region 1050 illustrated in an example of FIG. 11B is displayed in the confirmation request display region 1050 of the screen 1000 illustrated in an example of FIG. 11A. For example, a confirmation request (1) display region 1110, a confirmation request (2) display region 1120, and a confirmation request (3) display region 1130 which indicate a confirmation request transmitted to the confirmer are displayed in the confirmation request display region 1050.

In the confirmation request (1) display region 1110, for example, "there is a confirmation request from member 1 " . . . request materials have been updated"", and a detail button 1112 are displayed. In the confirmation request (2) display region 1120, for example, "there is a confirmation request from member 2 " . . . is it alright with this?"", and a detail button 1122 are displayed. In the confirmation request (3) display region 1130, for example, "there is a confirmation request from member 3 " . . . attend please"", and a detail button 1132 are displayed. Meanwhile, a character string displayed within " " is a character string written in the confirmation request reception region 930 illustrated in the example of FIG. 9B.

In step S512, it is determined whether or not a confirmation request has been selected by an operation of a confirmer. In a case where the confirmation request is selected, the processing proceeds to step S514. Otherwise, the processing stands by until the confirmation request is selected. For example, the detail button 1112 illustrated in FIG. 11B, or the like is selected.

In step S514, it is determined whether or not the number of members of the corresponding topic is three or more. In a case where the number of members of the topic is three or more, the processing proceeds to step S516. Otherwise, the processing proceeds to step S518.

Meanwhile, the process of step S514 may not be performed. That is, even in a case where the number of members of the topic is two, the process of step S516 may be performed.

In step S516, a message region 1030 of the user terminal 200 of the confirmer is displayed in accordance with the topic and the chat for which a confirmation request has been made.

Figure 11C:
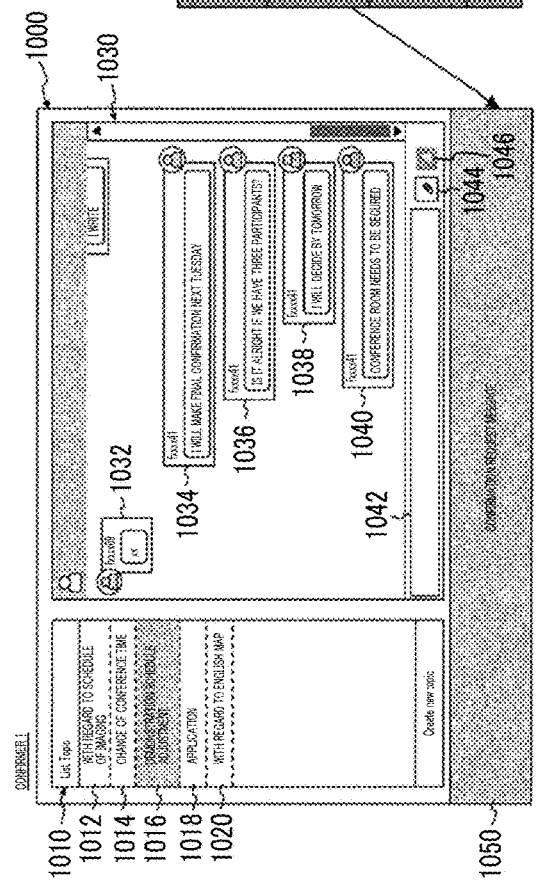

For example, in a case where the detail button 1112 illustrated in FIG. 11B is selected, the screen 1000 as illustrated in FIG. 11C is displayed. That is, a confirmation button 1160 is displayed in the vicinity of a message 1036. Meanwhile, the message 1036 corresponds to the message 436 for which a confirmation request has been made in the example of FIG. 9A (that is, the message 436 and the message 1036 have the same display content). In a case where another screen (for example, the screen shows the same topic, but shows the earlier conversation content, a conversation content of another topic, or the like) is displayed in the message region 1030 of the confirmer, a shift to the screen displaying the message 1036 is performed. Specifically, messages (a message 1032, a message 1034, a message 1038, and a message 1040) before and after the message 1036 are displayed so that the message 1036 is positioned at the center in the message region 1030.

Meanwhile, in step S516, the target message 1036 may be displayed at the end in the message region 1030 (that is, a message group before the message 1036 may be displayed). In this case, it is possible to ascertain the progress until the contribution of the message 1036 is performed. In addition, the target message 1036 may be displayed at the beginning in the message region 1030 (that is, a message group after the message 1036 may be displayed). In this case, it is possible to ascertain the progress after the contribution of the message 1036 is performed.

Figure 11D:
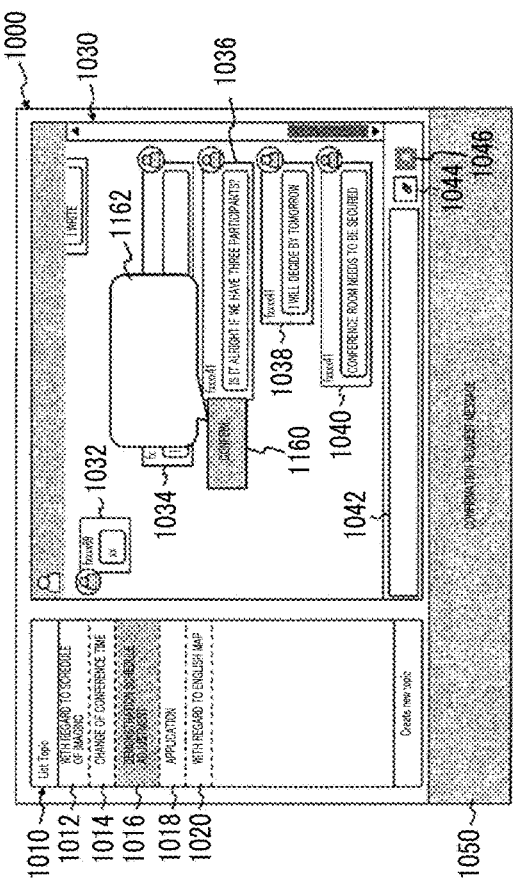

In step S518, confirmation processing is performed in accordance with the confirmer's operation. For example, in a case where the confirmation button 1160 illustrated in the example of FIG. 11C is selected, a confirmation reception display region 1162 is displayed. As illustrated in FIG. 11D, a confirmation message reception region 1164 and a transmission button 1166 are displayed in the confirmation reception display region 1162. A character string is written in the confirmation message reception region 1164 by the confirmer. In a case where the transmission button 1166 is selected, the character string in the confirmation message reception region 1164 is transmitted to the member X who is a requester. The character string in the confirmation message reception region 1164 may be displayed as a message. That is, the character string may be displayed at the end in the message region 430 of the screen 400 of the member X and at the end in the message region 1030 of the screen 1000 of the confirmer (that is, as the last message). In addition, the character string may be displayed inclusive of a link to a message (the message 436, the message 1036) for which a request has been made.

FIG. 12 is a flowchart illustrating a processing example according to this exemplary embodiment. This processing is processing for generating a confirmation request list of a confirmer in the confirmation request display region 1050 illustrated in the example of FIG. 11B.

In step S1202, it is determined whether or not a confirmation request message has been transmitted to a confirmer in accordance with a requester's operation. In a case where the confirmation request message has been transmitted to the confirmer, the processing proceeds to step S1204. Otherwise, the processing stands by until the confirmation request message is transmitted to the confirmer.

In step S1204, a confirmation request list is generated for each confirmer.

In step S1206, the confirmation request list is transmitted to the user terminal 200 of the confirmer and is displayed.

In step S1208, it is determined whether or not a reply has been made to the confirmation request in accordance with the confirmer's operation. In a case where a reply has been made, the processing returns to step S1204. Otherwise, the processing is terminated (step S1299). That is, in a case where a reply has been made (a case where a response has been made, specifically, a case where the transmission button 1166 illustrated in the example of FIG. 11D is selected), the returned confirmation request is deleted from the confirmation request list, and the confirmation request list is updated. The updated confirmation request list is transmitted to the user terminal 200 of the confirmer and is displayed in the confirmation request display region 1050.

FIG. 13 is a flowchart illustrating a processing example according to this exemplary embodiment. This processing is the same as the processing illustrated in the example of FIG. 12, but is processing capable of dealing with even a case where a different topic is selected.

In step S1302, it is determined whether or not a confirmation request message has been transmitted to a confirmer in accordance with a requester's operation. In a case where the confirmation request message has been transmitted to the confirmer, the processing proceeds to step S1304. Otherwise, the processing stands by until the confirmation request message is transmitted to the confirmer.

In step S1304, a confirmation request list (the order of the degree of importance) in a topic opened by the confirmer is generated. For example, this will be described later with reference to a flowchart illustrated in FIG. 15.

In step S1306, the confirmation request list is transmitted to the confirmer and is displayed.

In step S1308, it is determined whether or not the confirmer has opened another topic. In a case where the confirmer has opened another topic, the processing returns to step S1304. Otherwise, the processing proceeds to step S1310. That is, in a case where the confirmer has opened another topic, a confirmation request list is generated again. This is because individual degrees of importance may different from each other by opening another topic.

In step S1310, it is determined whether or not a reply has been made to the confirmation request in accordance with the confirmer's operation. In a case where a reply has been made, the processing returns to step S1304. Otherwise, the processing is terminated (step S1399).

FIGS. 14A to 14B2 are diagrams illustrating a processing example according to this exemplary embodiment. The drawings illustrate a specific example of the processing illustrated in the example of FIG. 13.

The example of FIG. 14A shows a state where a topic 1410 in a list topic region 1405 is selected on a screen 1400. In this case, a confirmation request display region 1430 is displayed as illustrated in FIG. 14B1. That is, a confirmation request (1) display region 1432, a confirmation request (2) display region 1436, and a confirmation request (3) display region 1440 are displayed in the confirmation request display region 1430 in this order. Specifically, the regions are displayed in order of similarity to the content of the topic 1410. For example, the making of the confirmation request on the screen of the selected topic increases the degree of importance (the ranking of display is high). In addition, the degree of similarity (inner product) between a semantic vector constituted by a character string of a message group before or after the message for which a confirmation request is made and a semantic vector constituted by a character string of a message group in the selected topic is calculated, and display may be performed in descending order of the degree of similarity.

Here, in a case where selection is changed from the topic 1410 to the selection of the topic 1420 in the list topic region 1405, the confirmation request display region 1430 is displayed as illustrated in FIG. 14B2. That is, a confirmation request (1) display region 1452, a confirmation request (2) display region 1456, and a confirmation request (3) display region 1460 are displayed in the confirmation request display region 1430 in this order. Meanwhile, a content in the confirmation request (1) display region 1452 is a content in the confirmation request (2) display region 1436, a content in the confirmation request (2) display region 1456 is a content in the confirmation request (3) display region 1440, and a content in the confirmation request (3) display region 1460 is a content in the confirmation request (1) display region 1432. Specifically, the regions are displayed in order of similarity to the content of the topic 1420.

Meanwhile, in the examples of FIG. 13 and FIGS. 14A to 14B2, in a case where a topic is changed, the order of display in the confirmation request display region 1430 is changed. However, the degree of importance (the order of display) may be changed for each portion in the topic. For example, the degree of importance may be changed in accordance with display scrolling of a message region 1480. In this case, the degree of similarity to a message group displayed in the message region 1480 may be calculated.

Figure 15:
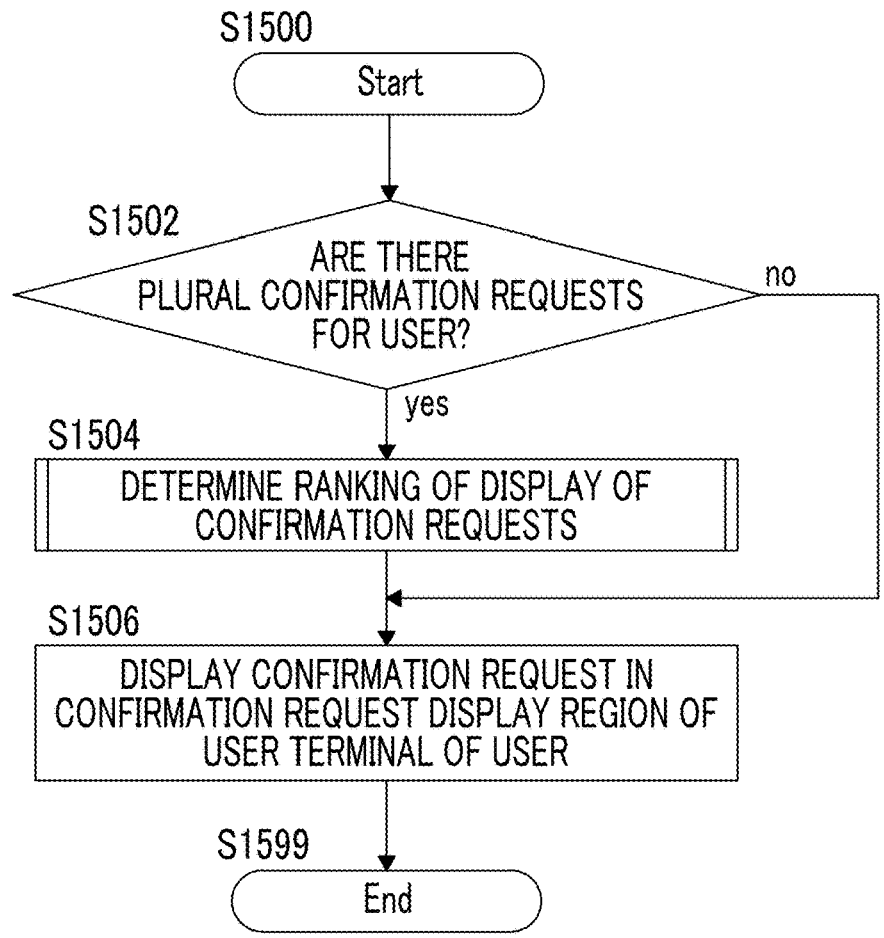
FIG. 15 is a flowchart illustrating a processing example according to this exemplary embodiment.

FIG. 15 is a flowchart illustrating a processing example according to this exemplary embodiment.

In step S1502, it is determined whether or not there are plural confirmation requests for a user. In a case where there are plural confirmation requests, the processing proceeds to step S1504. Otherwise, the processing proceeds to step S1506.

In step S1504, the ranking of display of the confirmation requests is determined. Regarding the process of step S1504, any one flowchart illustrated in examples of FIGS. 16, 18, 19, and 21 (or a combination thereof) may be used. Details thereof will be described later.

In step S1506, the confirmation request is displayed in the confirmation request display region 450 of the user terminal 200 of the user.

Figure 16:
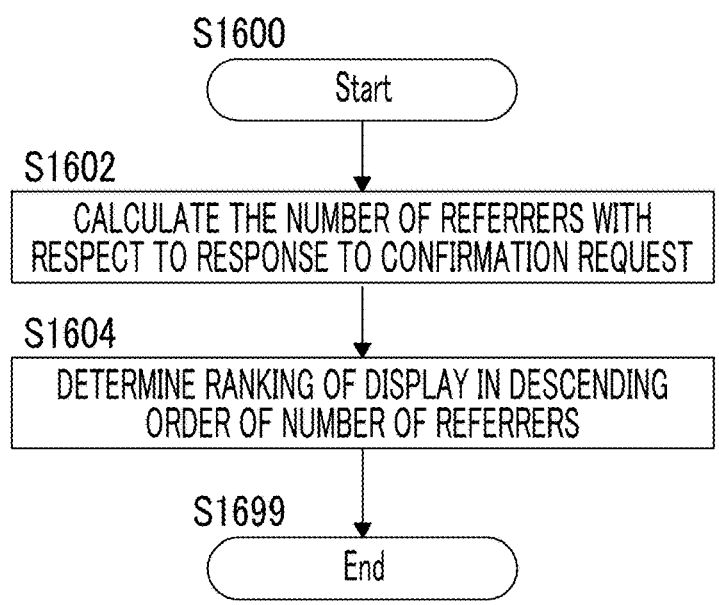
FIG. 16 is a flowchart illustrating a processing example according to this exemplary embodiment.

FIG. 16 is a flowchart illustrating a processing example (step S1504) according to this exemplary embodiment.

In step S1602, the number of referrers with respect to a response to a confirmation request is calculated. For example, a response management table 1700 may be used. Specifically, the number of referrers may be calculated in accordance with the number of referrer IDs in a referrer ID column 1760 of the response management table 1700. FIG. 17 is a diagram illustrating an example of a data structure of the response management table 1700. The response management table 1700 includes a response No column 1710, a correspondence confirmation request No column 1720, a response date and time column 1730, a response user ID column 1740, a response content column 1750, a referrer ID column 1760, and a reference date and time column 1770. The response No column 1710 stores a response No. Here, the response No refers to information for identifying an individual response. The correspondence confirmation request No column 1720 stores a correspondence confirmation request No of a correspondence confirmation request corresponding to the response. Here, the correspondence confirmation request No refers to information for identifying an individual correspondence confirmation request. The response date and time column 1730 stores a date and time when the response is made. The response user ID column 1740 stores a user ID of a user having made a response. The response content column 1750 stores a content of the response. The referrer ID column 1760 stores information (referrer ID) for uniquely identifying a referrer who refers to the response in this exemplary embodiment. The reference date and time column 1770 stores a date and time when reference is made by the referrer. Meanwhile, the referrer ID column 1760 and the reference date and time column 1770 are added whenever a response is referred to.

In step S1604, the ranking of display is determined in descending order of the number of referrers.

The processing illustrated in the example of FIG. 16 may be performed as follows.

Access to a topic waiting for a response may be used. For example, when a member makes a confirmation request on a topic A, the degree of importance of the confirmation request may be increased in accordance with the number of times of viewing of the topic A and the number of times of writing of a message after the confirmation request. The result of the confirmation of a respondent shows that a great interest is taken from a member concerned in the topic A and the confirmation request is considered to be important.

In addition, the degree of importance of a confirmation request may be increased in a topic for which a response or a confirmation request is made, the topic being a topic for which the number of times of viewing is large and the number of times of writing of a message is small. This is because there is a strong possibility that an argument is stayed because there is a great interest in a response to the confirmation request, while a response is not made.

Figure 18:
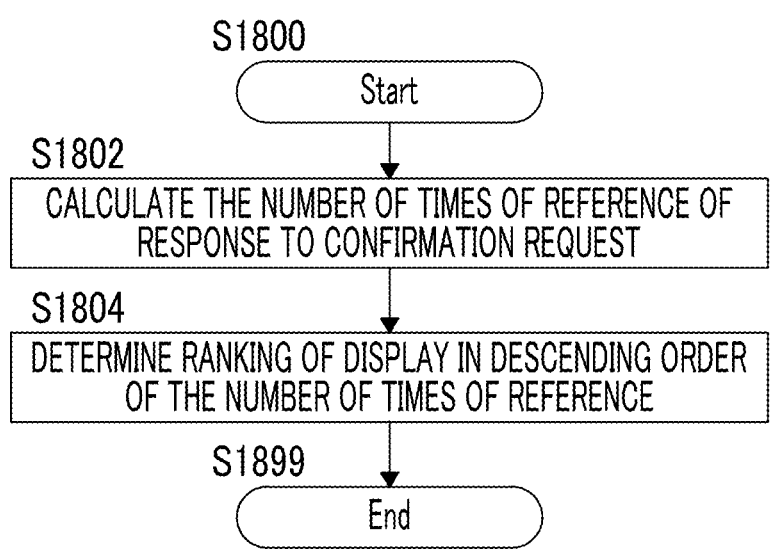
FIG. 18 is a flowchart illustrating a processing example according to this exemplary embodiment.

FIG. 18 is a flowchart illustrating a processing example (step S1504) according to this exemplary embodiment.

In step S1802, the number of times of reference of a response to a confirmation request is calculated. For example, the number of times of reference may be calculated in accordance with the number of reference dates and times in the reference date and time column 1770 of the response management table 1700.

In step S1804, the ranking of display is determined in descending order of the number of times of reference.

Although the ranking of display is determined in accordance with the number of referrers in the processing based on the flowchart illustrated in the example of FIG. 16, the ranking of display is determined in accordance with the number of times of reference in the processing based on the flowchart illustrated in the example of FIG. 18. Therefore, even in a case where one user repeatedly performs reference, the ranking of display is set to be a high rank.

Figure 19:
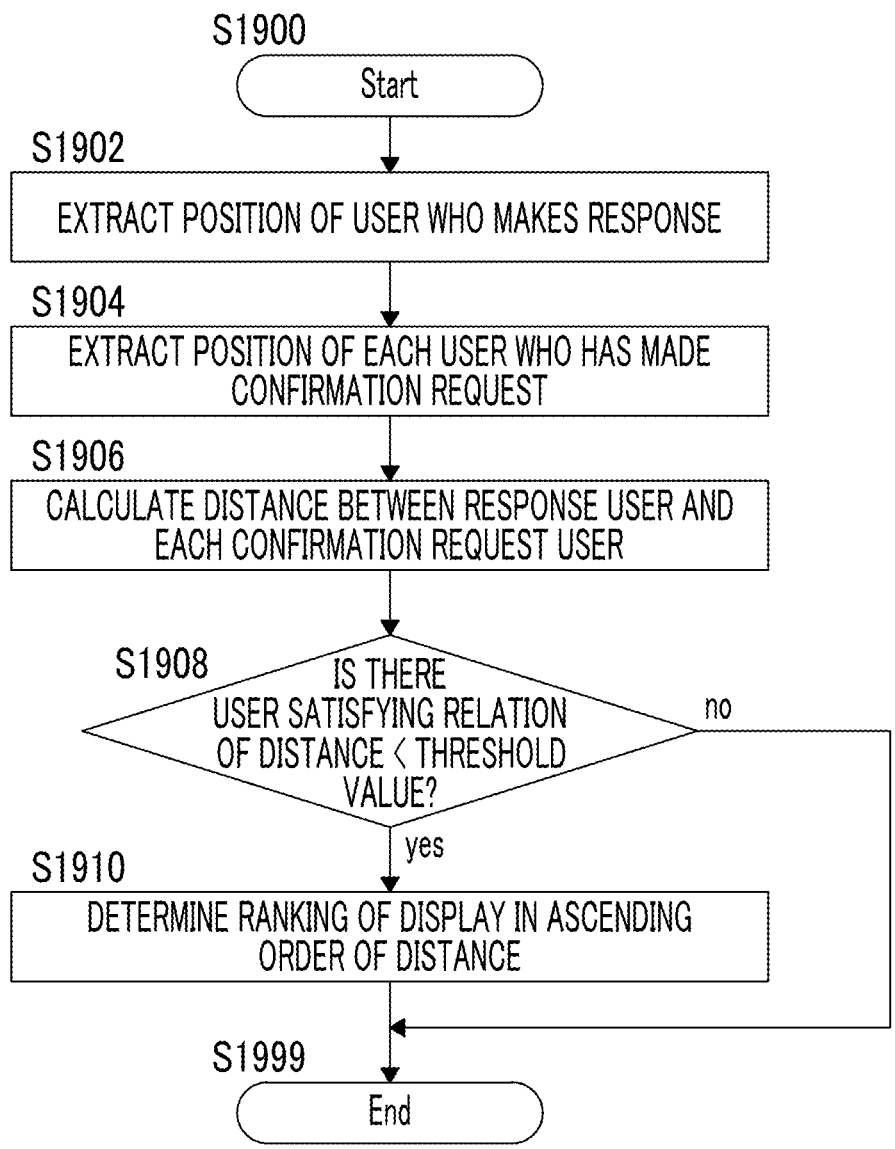
FIG. 19 is a flowchart illustrating a processing example according to this exemplary embodiment.

FIG. 19 is a flowchart illustrating a processing example (step S1504) according to this exemplary embodiment.

Figure 20:
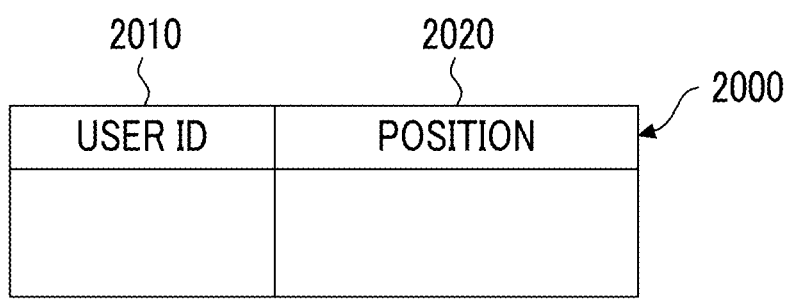
FIG. 20 is a diagram illustrating an example of a data structure of a user and position correspondence table.

In step S1902, the position of a user who makes a response is extracted. For example, the position may be extracted from the user terminal 200. FIG. 20 is a diagram illustrating an example of a data structure of a user and position correspondence table 2000. The user and position correspondence table 2000 includes a user ID column 2010 and a position column 2020. The user ID column 2010 stores a user ID. The position column 2020 stores the position of the user. The position of the user may be measured using a GPS in a case of a portable terminal, or a position which is measured in advance may be used in a case of a fixed PC or the like.

In step S1904, the position of each user who has made a confirmation request is extracted.

In step S1906, a distance between a response user and each confirmation request user is calculated.

In step S1908, it is determined whether or not there is a user satisfying a relation of distance<threshold value. In a case where there is a user satisfying the relation, the processing proceeds to step S1910. Otherwise, the processing is terminated (step S1999).

In step S1910, the ranking of display is determined in ascending order of the distance.

The processing illustrated in the example of FIG. 19 may be performed as follows.

In a case where a user to make a response approaches, a user having made a confirmation request may be notified of the approach of the user. By this processing, it is possible to verbally remind the user of the confirmation request.

In a case where the user having made the confirmation request approaches, the degree of importance of the confirmation request of the user to make a response may be increased, and the user may be notified of the approach of the user having made the confirmation request. The user to make a response may verbally talk about a confirmation content.

In addition, the degree of importance may not be increased in a case of being unable to deal with the approach of the user by using not only positional information but also busyness (biological information such as heart beats, schedule information, or the like of the user in the vicinity).

In addition, the degree of similarity between an event of a schedule of a user (any one of a user having made a confirmation request, a user to make a response, and a user belonging to a topic for which the confirmation request is made, or a combination thereof) and a title or a member of the topic for which the confirmation request is made is calculated, and the degree of importance may be increased in a case where there is a near schedule event.

Figure 21:
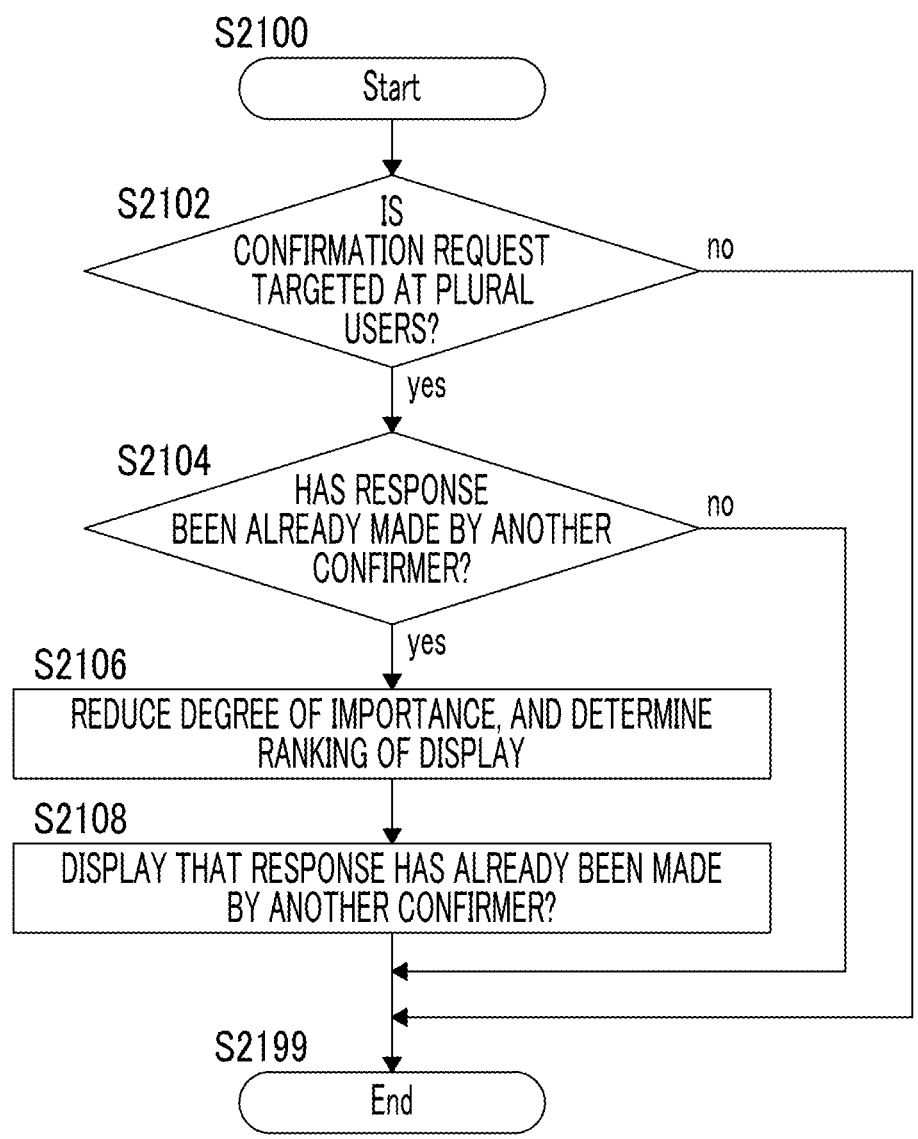
FIG. 21 is a flowchart illustrating a processing example according to this exemplary embodiment.

FIG. 21 is a flowchart illustrating a processing example (step S1504) according to this exemplary embodiment. In particular, the flowchart illustrates a processing example in a case where there are plural users to make a response.

In step S2102, it is determined whether or not a confirmation request is targeted at the plural users. In a case where the confirmation request is targeted at the plural users, the processing proceeds to step S2104. Otherwise, the processing is terminated (step S2199).

In step S2104, it is determined whether a response has already been made by another confirmer (another user to make a response). In a case where a response has already been made, the processing proceeds to step S2106. Otherwise, the processing is terminated (step S2199).

In step S2106, the degree of importance is reduced, and the ranking of display is determined.

In step S2108, it is displayed that a response has already been made by another confirmer.

Figure 22:
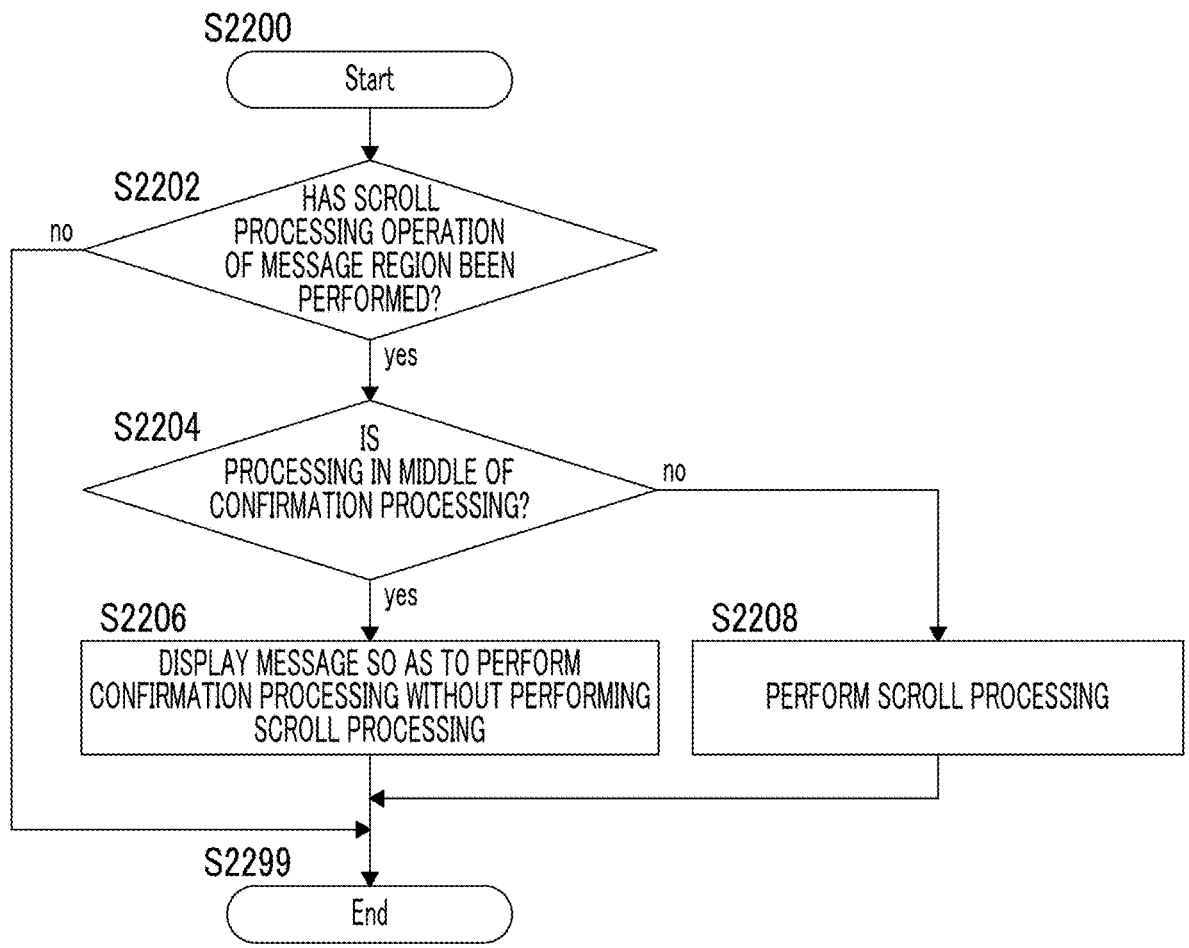
FIG. 22 is a flowchart illustrating a processing example according to this exemplary embodiment.

FIG. 22 is a flowchart illustrating a processing example according to this exemplary embodiment.

The process of step S518 in the flowchart illustrated in the example of FIG. 5 may be performed as follows.

In step S2202, it is determined whether or not a scroll processing operation of the message region 430 has been performed. In a case where the scroll processing operation has been performed, the processing proceeds to step S2204. Otherwise, the processing is terminated (step S2299).

In step S2204, it is determined whether or not the processing is in the middle of confirmation processing. In a case where the processing is in the middle of confirmation processing, the processing proceeds to step S2206. Otherwise, the processing proceeds to step S2208.

In step S2206, a message is displayed so as to perform the confirmation processing without performing scroll processing.

In step S2208, scroll processing is performed.

Figure 23:
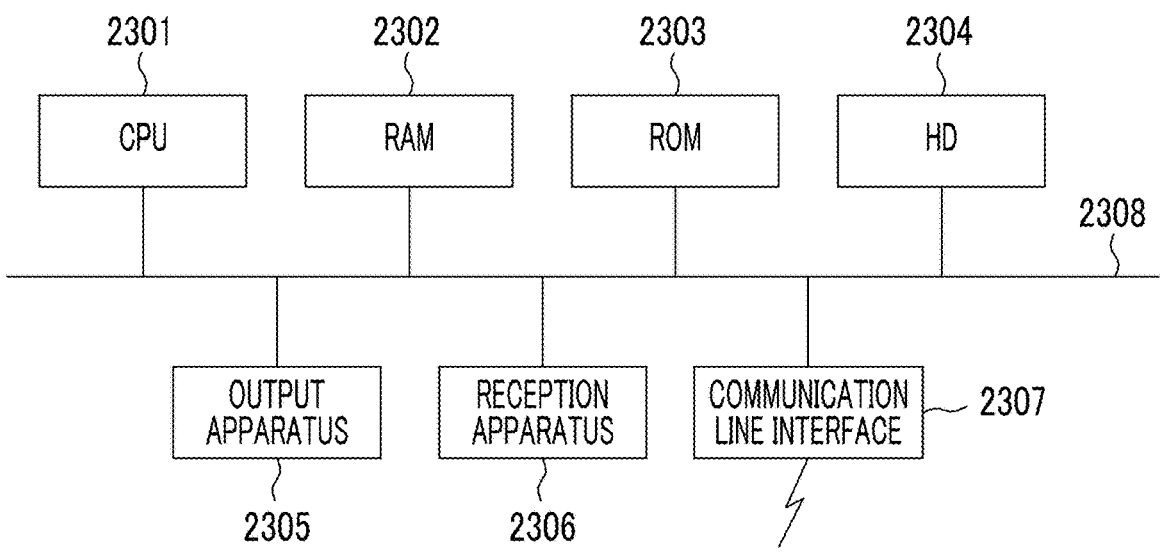
FIG. 23 is a block diagram illustrating a hardware configuration example of a computer for realizing this exemplary embodiment.

Meanwhile, a hardware configuration of a computer executing a program as this exemplary embodiment (the information processing apparatus 100, the user terminal 200, the server 250) is a general computer as illustrated in FIG. 23, and specifically, is a personal computer, a computer that may serve as a server, or the like. That is, as a specific example, a CPU 2301 is used as a processing unit (computational unit), and a RAM 2302, a ROM 2303, and an HD 2304 are used as storage apparatuses. As the HD 2304, for example, a hard disk or a Solid State Drive (SSD) may be used. The computer includes the CPU 2301 that executes programs such as the communication module 105, the transmission module 110, the reception module 115, the conversation processing module 120, the conversation module 125, the request module 130, the response module 135, the conversation presentation module 140, the urging presentation module 145, and the shifting module 150, the RAM 2302 that stores the programs and data, the ROM 2303 that stores programs for starting up the computer, and the like, the HD 2304 which is an auxiliary storage apparatus (may be a flash memory or the like) which stores the topic management table 600, the chat management table 700, the confirmation request management table 800, the response management table 1700, the user and position correspondence table 2000, and the like, a reception apparatus 2306 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 2305 such as a CRT, a liquid crystal display, or a speaker, a communication line interface 2307, such as a network interface card, for connection to a communication network, and a bus 2308 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 23 shows one configuration example. This exemplary embodiment is not limited to the configuration illustrated in FIG. 23, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 23 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more functions of a scanner, a printer, a copying machine, and a facsimile), and the like, in addition to a personal computer.

With regard to a confirmation request, the following processing may be performed.

(1) In a case where a user to make a response has already made a response to a past confirmation request B similar to a confirmation request A, the degree of importance of the confirmation request A may be increased.

(2) In a case where there is a document (a document included in the user terminal 200 of the user to make a response, a document stored in a document storage server or the like by the user to make a response), similar to a confirmation request, to which a user to make a response belongs or there is another topic to which the user to make a response belongs, the confirmation request having the similar information applied thereto is presented to the user to make a response. As the degree of similarity becomes higher, the degree of importance of the confirmation request may be increased.

By these processing, it is considered that the user to make a response may conduct a deal more easily by using the past related information (a response may be made in a short period of time), and thus it is possible to urge the response as a response to be made first.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising
a memory, storing a program; and
a processor, configured to execute a plurality of modules in the program stored in the memory, the plurality of modules comprises:
a conversation presentation module that presents conversation contents in a conversation, which is performed by a plurality of persons, in time series;
a request module that receives a request;
an urging presentation module that presents urging of a response to the request, wherein the request is avoided to be presented in a case where the number of persons in the conversation is less than a predetermined number; and
a shifting module that shifts a screen of a user terminal so as to be capable of presenting at least one of the conversation contents included in a message region before or after the request is made, in a case where the response is made,
wherein the shifting module that shifts the screen of the user terminal so as to be capable of presenting the at least one of the conversation contents comprises
presenting the at least one of the conversation contents on the screen according to a smaller time interval selected from a first time interval and a second time interval,
the first time interval is between a time that the conversation contents immediately before the request is presented by the urging presentation module and the time when the request module receives the request, and
the second time interval is between a time that the conversation contents immediately after the request is presented by the urging presentation module and the time when the request module receives the request.

2. The information processing apparatus according to claim 1,
wherein the shifting module performs the shift in a case where the number of persons performing the conversation is equal to or greater than a predetermined number of persons.

3. The information processing apparatus according to claim 2,
wherein the shifting module performs the shift in a case where the conversation is performed by three or more persons.

4. The information processing apparatus according to claim 1,
wherein in a case where there are a plurality of requests, the urging presentation module presents the requests in accordance with degrees of importance of the requests.

5. The information processing apparatus according to claim 4,
wherein the urging presentation module increases the degree of importance of the request in a case where the response to the request is referred to by a person other than a person having made the request.

6. The information processing apparatus according to claim 5,
wherein the urging presentation module increases the degree of importance of the request in a case where there is a predetermined number of persons having made reference.

7. The information processing apparatus according to claim 4,
wherein the urging presentation module increases the degree of importance of the request in a case where there is a predetermined number of times of reference of the response to the request.

8. The information processing apparatus according to claim 4,
wherein the urging presentation module increases the degree of importance of the request in a case where a response is made and a user having made the request is in the vicinity of a user having made the response.

9. The information processing apparatus according to claim 8,
wherein the urging presentation module detects a position of the user having made the request and a position of the user having made the response, and determines the degree of importance in accordance with a distance between the users.

10. The information processing apparatus according to claim 9,
wherein the urging presentation module determines the degree of importance based on the distance in a case where the distance is equal to or less than a predetermined value.

11. The information processing apparatus according to claim 1,
wherein in a case where there are a plurality of users making a response to the request and the user has made a response, the urging presentation module reduces and presents a degree of importance of the request in the user who has not made a response.

12. The information processing apparatus according to claim 11,
wherein the urging presentation module performs presentation to the effect that another user has made a response, with respect to the user who has not made a response.

13. The information processing apparatus according to claim 1,
wherein the shifting module does not shift the screen until the response is made.

14. The information processing apparatus according to claim 1,
wherein in a case where there are a plurality of conversation groups, the urging presentation module also presents a request in a conversation in a second group different from a first group performing a current conversation.

15. The information processing apparatus according to claim 14,
wherein in a case where a response to the request in the conversation in the second group is made, the shifting module performs a shift to a screen presenting the conversation in the second group.

16. The information processing apparatus according to claim 15,
wherein the shifting module does not perform a shift to a screen presenting a conversation in another group until a response to the request is made.

17. The information processing apparatus according to claim 16,
wherein the shifting module does not perform return to a screen presenting the conversation in the first group until a response to the request is made.

18. A non-transitory computer readable medium storing a program causing a computer to execute a process for information processing, the process comprising:
presenting conversation contents in a conversation, which is performed by a plurality of persons, in time series;
receiving a request, wherein the request is avoided to be presented by an urging presentation module in a case where the number of persons in the conversation is less than a predetermined number;
presenting urging of a response to the request; and
shifting a screen of a user terminal so as to be capable of presenting at least one of the conversation contents included in a message region before or after the request is made, in a case where the response is made,
wherein the shifting module that shifts the screen of the user terminal so as to be capable of presenting the at least one of the conversation contents comprises
presenting the at least one of the conversation contents on the screen according to a smaller time interval selected from a first time interval and a second time interval,
the first time interval is between a time that the conversation contents immediately before the request is presented by the urging presentation module and the time when a request module receives the request, and
the second time interval is between a time that the conversation contents immediately after the request is presented by the urging presentation module and the time when a request module receives the request.

19. An information processing apparatus method comprising:
presenting conversation contents in a conversation, which is performed by a plurality of persons, in time series;
receiving a request, wherein the request is avoided to be presented by an urging presentation module in a case where the number of persons in the conversation is less than a predetermined number;
presenting urging of a response to the request; and
shifting a screen of a user terminal so as to be capable of presenting at least one of the conversation contents included in a message region before or after the request is made, in a case where the response is made,
wherein the shifting module that shifts the screen of the user terminal so as to be capable of presenting the at least one of the conversation contents comprises
presenting the at least one of the conversation contents on the screen according to a smaller time interval selected from a first time interval and a second time interval,
the first time interval is between a time that the conversation contents immediately before the request is presented by the urging presentation module and the time when a request module receives the request, and
the second time interval is between a time that the conversation contents immediately after the request is presented by the urging presentation module and the time when a request module receives the request.

* * * * *